United States Patent
Takano

(10) Patent No.: US 9,337,971 B2
(45) Date of Patent: *May 10, 2016

(54) WIRELESS RESOURCE ALLOCATION METHOD, WIRELESS RESOURCE ALLOCATION DEVICE, AND COMMUNICATION SYSTEM

(75) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 123 days.

This patent is subject to a terminal disclaimer.

(21) Appl. No.: 14/113,235

(22) PCT Filed: Apr. 16, 2012

(86) PCT No.: PCT/JP2012/060246
§ 371 (c)(1),
(2), (4) Date: Oct. 22, 2013

(87) PCT Pub. No.: WO2012/165067
PCT Pub. Date: Dec. 6, 2012

(65) Prior Publication Data
US 2014/0050177 A1   Feb. 20, 2014

(30) Foreign Application Priority Data
May 30, 2011   (JP) ................ 2011-119885

(51) Int. Cl.
*H04L 5/00* (2006.01)
*H04W 72/08* (2009.01)

(52) U.S. Cl.
CPC .......... *H04L 5/0032* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 2003/0214918 A1* | 11/2003 | Marinier | 370/310 |
| 2009/0201838 A1 | 8/2009 | Zhang et al. | |
| 2010/0124184 A1* | 5/2010 | Dayal et al. | 370/280 |
| 2011/0096703 A1* | 4/2011 | Nentwig et al. | 370/294 |
| 2013/0336299 A1* | 12/2013 | Lee et al. | 370/336 |
| 2014/0036738 A1* | 2/2014 | Kim et al. | 370/280 |

(Continued)

FOREIGN PATENT DOCUMENTS

| | | | |
|---|---|---|---|
| JP | 2010-539785 A | | 12/2010 |
| WO | WO2012/149673 | * | 11/2012 |
| WO | WO2012/155323 | * | 11/2012 |

OTHER PUBLICATIONS

International Search Report issued Jun. 5, 2012 in PCT/JP2012/060246.

"Discussion of the Possibility of Using Subframe Offset for Interference Avoidance in TDD Systems", CMCC, 3GPP TSG-RAN WG1 #62bis, R1-105272, Oct. 11-15, 2010, 6 pages.

(Continued)

*Primary Examiner* — Gary Mui
(74) *Attorney, Agent, or Firm* — Oblon, McClelland, Maier & Neustadt, L.L.P.

(57) ABSTRACT

An allocation of wireless resources is performed to avoid interference caused as an uplink and a downlink are mismatched between neighboring cells. When interference at a base station is desired to be reduced, in each portion causing interference at a base station side, an ABS is applied to any one of downlink and uplink sub frames. When interference at a terminal is desired to be reduced, in each portion causing interference at a terminal side, transmission or reception of a terminal is stopped. When both interference at a base station side and interference at a terminal side are desired to be reduced, basically, it is desirable to stop the same portion as when interference between base stations is reduced.

12 Claims, 24 Drawing Sheets

(56) References Cited

U.S. PATENT DOCUMENTS

2014/0056186 A1* 2/2014 Gao et al. .................. 370/280
2014/0098720 A1* 4/2014 Zeng et al. .................. 370/280

OTHER PUBLICATIONS

"An eICIC Solution for Macro-Femto Deloyment in TDD System", Fujitsu, 3GPP TSG RAN WG1 #62bis, R1-105683, Oct. 11-15, 2010, 4 pages.

"ABS Signaling Considerations for LTE-A TDD", New Postcom, 3GPP TSG RAN WG1Meeting #63, R1-105940, Nov. 15-19, 2010, 4 pages.

"Cell Specific TDD Configuration with Inter-band CA", Nokia Siemens Networks, Nokia Corporation, 3GPP TSG-RAN WG2 Meeting #74, R2-112946, May 9-13, 2011, 4 pages.

Extended European Search Report issued Oct. 22, 2015 in Patent Application No. 12793032.9.

* cited by examiner

*FIG. 1*

| | | | | | | | | | |
|---|---|---|---|---|---|---|---|---|---|
| CONFIGURATION 0 | #0 D | #1 S | #2 U | #3 U | #4 U | #5 D | #6 S | #7 U | #8 U | #9 U |
| CONFIGURATION 6 | #0 D | #1 S | #2 U | #3 U | #4 U | #5 D | #6 S | #7 U | #8 U | #9 D |
| CONFIGURATION 1 | #0 D | #1 S | #2 U | #3 U | #4 D | #5 D | #6 S | #7 U | #8 U | #9 D |
| CONFIGURATION 3 | #0 D | #1 S | #2 U | #3 U | #4 D | #5 D | #6 D | #7 D | #8 D | #9 D |
| CONFIGURATION 2 | #0 D | #1 S | #2 U | #3 D | #4 D | #5 D | #6 S | #7 U | #8 D | #9 D |
| CONFIGURATION 4 | #0 D | #1 S | #2 U | #3 U | #4 D | #5 D | #6 D | #7 D | #8 D | #9 D |
| CONFIGURATION 5 | #0 D | #1 S | #2 U | #3 D | #4 D | #5 D | #6 D | #7 D | #8 D | #9 D |

| | #1 | #2 | #3 | #4 | #5 | #6 | #7 | #8 | #9 |
|---|---|---|---|---|---|---|---|---|---|
| CONFIGURATION 0 | D S U | U | U | U | D | S | U | U | U |
| CONFIGURATION 6 | D S U | U | U | U | D | S | U | U | D |
| CONFIGURATION 1 | D S U | U | U | D | D | S | U | U | D |
| CONFIGURATION 2 | D S U | U | D | D | D | S | U | D | D |
| CONFIGURATION 3 | D S U | U | U | D | D | D | D | D | D |
| CONFIGURATION 4 | D S U | U | D | D | D | D | D | D | D |
| CONFIGURATION 5 | D S U | U | D | D | D | D | D | D | D |

| | #0 D | #1 S | #2 U | #3 U | #4 U | #5 D | #6 S | #7 U | #8 U | #9 D |
|---|---|---|---|---|---|---|---|---|---|---|
| CONFIGURATION 0 | | | | | | | | | | |

*(Table representation of figure)*

| Configuration | #0 | #1 | #2 | #3 | #4 | #5 | #6 | #7 | #8 | #9 |
|---|---|---|---|---|---|---|---|---|---|---|
| CONFIGURATION 0 | D | S | U | U | U | D | S | U | U | D |
| CONFIGURATION 1 | D | S | U | U | D | D | S | U | U | D |
| CONFIGURATION 2 | D | S | U | D | D | D | S | U | D | D |
| CONFIGURATION 3 | D | S | U | U | U | D | D | D | D | D |
| CONFIGURATION 4 | D | S | U | U | D | D | D | D | D | D |
| CONFIGURATION 5 | D | S | U | D | D | D | D | D | D | D |
| CONFIGURATION 6 | D | S | U | U | U | D | S | U | U | D |

WIRELESS RESOURCE ALLOCATION METHOD, WIRELESS RESOURCE ALLOCATION DEVICE, AND COMMUNICATION SYSTEM

TECHNICAL FIELD

The technology disclosed in the present disclosure relates to a wireless resource allocation method, a wireless resource allocation device, and a communication system, which are capable of deciding an allocation of wireless resources in a cellular system operating according to a time division duplex (TDD) scheme, and more particularly, to a wireless resource allocation method, a wireless resource allocation device, and a communication system, which are capable of performing an allocation of wireless resources to avoid interference caused as an uplink and a downlink are mismatched when different configurations are used in neighboring cells.

BACKGROUND ART

Currently, in the third generation partnership project (3GPP), an international standard "international mobile telecommunications (IMT)-2000" of a 3G mobile communication system designed by an international telecommunication union (ITU) is being standardized. Long term evolution (LTE) which is one of data communication specifications designed by the 3GPP is a long term advanced system aiming for the fourth generation (4G) IMT-Advanced, and is called "3.9G (super 3G)." One of features of 4G lies in that a maximum communication rate or a quality improvement at a cell edge can be implemented using a technique such as a relay or a carrier aggregation.

The LTE is a communication scheme based on an orthogonal frequency division multiplexing (OFDM) modulation scheme, and employs OFDMA as a downlink wireless access scheme. Here, the OFDM is a multi-carrier scheme that allocate a plurality of data to frequency sub carriers which are orthogonal, that is, do not interfere with each other, and inverse fast Fourier transform (IFFT) is performed on each sub carrier to transform each sub carrier at a frequency axis into a signal at a time axis, and then the transformed signal is transmitted. Since transmission data are distributed to a plurality of carriers whose frequencies are orthogonal to each other and transmitted, a band of each carrier is narrow, frequency utilization efficiency is very high, and it is robust to delay distortion (frequency selective fading interference) caused by multiple paths. Further, orthogonal frequency division multiple access (OFDMA) is a multiple access scheme in which a single communication station does not occupy all sub carriers of OFDM signals, but a set of sub carriers on the frequency axis are allocated to a plurality of communication stations, and the sub carriers are shared among the plurality of communication stations. When a plurality of users use different sub carriers or different time slots (that is, division multiplexing is performed in the frequency direction and the time direction), communication can be performed without any interference.

Further, in the LTE, two ways of schemes of frequency division duplex (FDD) and time division duplex (TDD) can be selected.

In the FDD, an uplink-dedicated band and a downlink-dedicated band are used. In the uplink and the downlink, a format of a radio frame configured with 10 consecutive sub frames is used. Here, an uplink refers to communication from a user equipment (UE) (terminal) to an eNodeB (base station), and a downlink refers to communication from an eNodeB to a UE.

In the TDD, a format of a radio frame configured with 10 consecutive sub frames is also used. However, in the TDD, communication is performed using the same band in the uplink and the downlink. For this reason, as illustrated in FIG. 21, the radio frame configured with 10 consecutive sub frames #0 to #9 is shared and used such that sub frames are allocated as an uplink sub frame and a downlink sub frame (in FIG. 21, "D" represents a downlink sub frame, "U" represents an uplink sub frame, and "S" represents a special sub frame (which will be described later)).

In the past, the LTE is usually used in the FDD. However, in the FDD, there are restrictions that an uplink and a downlink are a pair, and a frequency band has to be secured. However, in the TDD, there are no such restrictions, and there is a merit that it is only necessary to secure one frequency band.

Further, let us consider from a point of view of a comparison of an uplink and a downlink in a radio frame. In the FDD, when 20 MHz is secured as each of an uplink band and a downlink band, the ratio of the uplink and the downlink is fixed to 1:1. On the other hand, in the TDD, when a band of 20 MHz is secured, as each sub frame is allocated to the uplink and the downlink as described above, it is possible to change the ratio of the uplink and the downlink in the radio frame.

In other words, since it is easy to arrange a frequency and change the ratio of the uplink and the downlink, the TDD system is expected to be increasingly used in the near further.

Meanwhile, in the TDD, it is necessary to secure a time to switch the downlink and the uplink. Specifically, when an allocation of a sub frame switches from the downlink to the uplink, it is necessary to insert "a special sub frame". From a point of view of an eNodeB side, a downlink signal of an eNodeB is subjected to a propagation delay in space and a processing delay in a UE and thus delayed compared to a downlink position of a format until reception of the downlink signal is completed by the UE. Meanwhile, in order for an uplink signal of an UE to reach an eNodeB up to an uplink position of a format, an UE needs to start transmission of the uplink signal before the uplink position of the format. Therefore, a special sub frame inserted between a downlink sub frame and an uplink sub frame is defined by an area (a downlink pilot timeslot: DwPTS) by a delay of a downlink signal, an area (an uplink pilot timeslot: UpPTS) corresponding to a degree by which an uplink signal is transmitted early, and a gap (gap period) between the two areas. FIG. 22 illustrates an example in which a special sub frame is inserted after the sub frame #1 when switching from the downlink to the uplink is performed between the sub frame #0 and the sub frame #2 in the radio frame using the configuration illustrated in FIG. 21. As described above, the TDD has the demerit that it is necessary to insert a special sub frame when switching between the downlink and the uplink is performed (switching from the downlink to the uplink is performed).

For example, a cellular communication system in which at least one of sub frames available for uplink or downlink traffic is configured to include a portion used in uplink traffic, a portion used in downlink traffic, and a guard period portion used as a guard period scheduled between the uplink portion and the downlink portion, and at least two consecutive periods of the three portions can be changed to comply with the current necessity of a system has been proposed (for example, see Patent Document 1).

The TDD of the LTE is defined in the 3GPP Rel 8. The sub frames #0 to #9 in the radio frame are allocated for the uplink and the downlink and shared as described above. In practice, the sub frames #0 and #5 are always allocated for the downlink and used to transmit a synchronous signal from the eNodeB. FIG. 23 illustrates seven configurations 0 to 6 of the TDD defined in the LTE (TS36.211 Table 4.2-2).

Referring to FIG. 23, the sub frame #0 is fixedly allocated to the downlink in all of the configurations, the sub frame #1 is fixedly allocated to the special sub frame in all of the configurations, the sub frame #2 is fixedly allocated to the uplink in all of the configurations, and the sub frame #5 is fixedly allocated to the downlink in all of the configurations. Further, there are cases in which the sub frame #6 is allocated to the special sub frame or the downlink, and the sub frames #3, #4, #7, #8, and #9 are allocated to either of the uplink and the downlink.

In the TDD of the LTE, the seven configurations 0 to 6 illustrated in FIG. 23 are defined, but each operator is generally considered to use one of the configurations. Therefore, each operator is not considered to use different configurations in neighboring eNodeBs.

In the 3GPP plenary Meeting held in Kansas City in the U.S.A., in March, 2011, a TDD operating method of solving an interference problem using different configurations in neighboring eNodeBs has been discussed. It means that the industry in the art consequently started to move in a way of allocating different TDD configurations to neighboring eNodeB.

When neighboring eNodeBs use different TDD configurations, as can be understood from FIG. 23, links of different directions such as the uplink and the downlink are allocated at the position of at least one of the sub frames #3, #4, and #6 to #9, that is, the uplink and the downlink are mismatched.

FIG. 24 illustrates an example in which links of different directions such as the uplink and the downlink are allocated at the position of the same sub frame of neighboring eNodeBs. In FIG. 24, in a cell 1, a downlink signal is transmitted from an eNodeB to a UE, and in a cell 2, an uplink signal is transmitted from a UE to an eNodeB. It is understood that a transmission signal from the eNodeB at the time of downlink in the cell 1 serves as interference to a reception signal of the eNodeB at the time of uplink in the neighboring cell 2. Further, it can be understood that a transmission signal from the UE at the time of uplink in the cell 2 serves as interference to a reception signal of the UE at the time of downlink in the neighboring cell 1. In FIG. 24, a downlink or uplink transmission signal between the eNodeB and the UE in the same cell is indicated by a solid line, and a signal serving as interference to the neighboring cell is indicated by a dotted line.

FIG. 25 illustrates an example in which different TDD configurations are used in relative large areas. For example, such configuration switching occurs in the boundary between Chiba Prefecture and Tokyo Metropolitan. In FIG. 25, the configuration 0 is used in the left area, and the configuration 1 is used in the right area. Referring back to FIG. 23, when the area using the configuration 0 is adjacent to the area using the configuration 1, the uplink and the downlink are mismatched at the positions of the sub frames #4 and #9.

FIG. 25 illustrates an example in which the sub frame #4 is allocated for the uplink (UP) in the left area using the configuration 0 but allocated for the downlink (DN) in the right area using the configuration 1. When different TDD configurations are used in relative large areas, a boundary surface in which the uplink and the downlink are mismatched extends across a relative broad area as indicated by a thick line in FIG. 25. Further, there occurs a problem in that along the mismatch boundary surface, a transmission signal from an eNodeB at the time of downlink serves as interference to a reception signal of a neighboring eNodeB at the time of uplink, and a transmission signal from a UE at the time of uplink serves as interference to a reception signal of a UE at the time of downlink in a neighboring cell.

FIG. 26 illustrates an example in which cells using different TDD configurations are located a spot-like manner. In FIG. 26, in an area using the configuration 1, only a cell indicated by a thick line is assumed to use the configuration 0. When the area using the configuration 0 is adjacent to the area using the configuration 1, the uplink and the downlink are mismatched at the positions of the sub frames #4 and #9 (same as above). In FIG. 26, a spot-like cell that uses the configuration 0 and is allocated the uplink (UP) for the sub frame #4 is surrounded by cells that use the configuration 1 and are allocated the downlink (DN) for the sub frame #4. In this case, a problem in which the uplink and the downlink are mismatched occurs locally.

CITATION LIST

Patent Document

Patent Document 1: JP 2010-539785 W

SUMMARY OF THE INVENTION

Problems to be Solved by the Invention

It is an object of the technology disclosed in the present disclosure to provide an wireless resource allocation method, a wireless resource allocation device, and a communication system, which are excellent and capable of appropriately performing an allocation of wireless resources to avoid interference caused as an uplink and a downlink are mismatched between neighboring cells in a cellular system operating according to the TDD scheme.

It is another object of the technology disclosed in the present disclosure to provide an wireless resource allocation method, a wireless resource allocation device, and a communication system, which are excellent and capable of appropriately performing an allocation of wireless resources to avoid interference caused as an uplink and a downlink are mismatched when different configurations are used in neighboring cells in a cellular system in which a plurality of configurations in which each of sub frames of a radio frame is allocated for an uplink or a downlink are defined.

Solutions to Problems

The present application has been made in view of the above-described problems, a technology described in a first aspect is a wireless resource allocation method, including:

a configuration switching step of switching configurations between neighboring cells when different configurations are used in the neighboring cells in a cellular communication system in which a plurality of configurations different in an uplink allocation and a downlink allocation of sub frames in a radio frame are defined; and an interference avoiding step of avoiding interference between the neighboring cells in sub frames in which the uplink and the downlink are mismatched between the neighboring cells whose configurations are switched in the configuration switching step.

According to a technology described in a second aspect of the present application, the wireless resource allocation method described in the first aspect is configured such that, in the interference avoiding step, in the sub frames in which the uplink and the downlink are mismatched between base stations of the neighboring cells whose configurations are switched, transmission from a base station through all downlink sub frames is stopped, or reception of a base station through all uplink sub frames is stopped.

According to a technology described in a third aspect of the present application, the wireless resource allocation method described in the first aspect is configured such that, in the interference avoiding step, in the sub frames in which the uplink and the downlink are mismatched between terminals of the neighboring cells whose configurations are switched, reception of a terminal through a mismatched portion of a downlink sub frame is stopped, or transmission from a terminal through a mismatched portion of an uplink sub frame is stopped.

According to a technology described in a fourth aspect of the present application, the wireless resource allocation method described in the first aspect is configured such that, in the interference avoiding step, when a single sub frame of a terminal in one of the cells whose configurations are switched is mismatched with two sub frames of a terminal in the other cell, transmission or reception through the single sub frame of the terminal in the one cell is stopped.

According to a technology described in a fifth aspect of the present application, in the cellular communication system, a control signal PDCCH is allocated to a first half portion of a downlink signal and a control signal PUCCH is allocated to both end portions of a system bandwidth of an uplink signal. Further, the wireless resource allocation method described in the first aspect is configured such that, in the interference avoiding step, in sub frames in which the uplink and the downlink are mismatched between the neighboring cells whose configurations are switched, interference between base stations or terminals of the neighboring cells is avoided while having transmission and reception of the control signal PDCCH and the control signal PUCCH not to be stopped.

According to a technology described in a sixth aspect of the present application, the wireless resource allocation method described in the fifth aspect is configured such that, in the interference avoiding step, in sub frames in which the uplink and the downlink are mismatched between base stations of the neighboring cells whose configurations are switched, transmission from a base station through a portion allocated to the control signal PUCCH in both ends of a system bandwidth is stopped for all mismatched downlink sub frames, and reception of a base station through a portion which is not allocated to the control signal PUCCH in a middle portion of a system band is stopped for all mismatched uplink sub frames.

According to a technology described in a seventh aspect of the present application, the wireless resource allocation method described in the fifth aspect is configured such that, in the interference avoiding step, in sub frames in which the uplink and the downlink are mismatched between terminals of the neighboring cells whose configurations are switched, reception of a terminal through a portion allocated to the control signal PUCCH in both ends of a system bandwidth in a mismatched portion of a downlink sub frame is stopped, and transmission from a terminal through a portion which is not allocated to the control signal PUCCH in a middle portion of a system band in a mismatched portion of an uplink sub frame is stopped.

According to a technology described in an eighth aspect of the present application, the wireless resource allocation method described in the sixth aspect is configured such that, a base station does not stop transmission through a portion which is allocated to the control signal PDCCH even in portions which are allocated to the control signal PUCCH in both ends of a system bandwidth in a mismatched downlink sub frame, and reception of a base station through a portion allocated to the control signal PUCCH in a neighboring cell in both ends of a mismatched uplink sub frame of a system bandwidth is stopped.

According to a technology described in a ninth aspect of the present application, the wireless resource allocation method described in the first aspect further includes a rearranging step of rearranging an order of the plurality of configurations in the ascending order of the number of downlink sub frames and in the descending order of the number of uplink sub frames. Further, in the configuration switching step, the method is configured to switch between neighboring cells according to the rearranged order of the rearranging step when different configurations are used in neighboring cells in the cellular communication system.

According to a technology described in a tenth aspect of the present application, the wireless resource allocation method described in the ninth aspect is configured such that, in the rearranging step, an order of at least some of the plurality of configurations are further rearranged as the number of sub frames in which the uplink and the downlink are mismatched between configurations decreases, in the ascending order of the number of downlink sub frames without applying the descending order of the number of uplink sub frames.

Further, a technology described in an eleventh aspect of the present application is a wireless resource allocation device, including:

a configuration switching unit that switches configurations between neighboring cells when different configurations are used in the neighboring cells in a cellular communication system in which a plurality of configurations different in an uplink allocation and a downlink allocation of sub frames in a radio frame are defined; and an interference avoiding unit that avoids interference between the neighboring cells in sub frames in which the uplink and the downlink are mismatched between the neighboring cells whose configurations are switched by the configuration switching unit.

Further, a technology described in a twelfth aspect of the present application is a communication system, including:

switching configurations between neighboring cells when different configurations are used in the neighboring cells in a cellular communication system in which a plurality of configurations different in an uplink allocation and a downlink allocation of sub frames in a radio frame are defined; and avoiding interference between the neighboring cells in sub frames in which the uplink and the downlink are mismatched between the neighboring cells whose configurations are switched.

Here, a "system" refers to one in which a plurality of devices (or functional modules for implementing a specific function) are logically aggregated, and it is not consequential practically whether the devices or the functional modules are within a single housing.

Effects of the Invention

According to the technology disclosed in the present disclosure, it is possible to provide an wireless resource allocation method, a wireless resource allocation device, and a communication system, which are excellent and capable of appropriately performing an allocation of wireless resources to avoid interference caused as an uplink and a downlink are mismatched between neighboring cells in a cellular system operating according to the TDD scheme.

Further, according to the technology disclosed in the present disclosure, it is possible to provide an wireless resource allocation method, a wireless resource allocation device, and a communication system, which are excellent and capable of appropriately performing an allocation of wireless resources to avoid interference caused as an uplink and a downlink are mismatched when different configurations are used in neighboring cells in a cellular system in which a plurality of configurations in which each of sub frames of a radio frame is allocated for an uplink and a downlink are defined.

In the cellular communication system according to the technology disclosed in the present disclosure, since different TDD configurations can be used according to a traffic state, the throughput of the entire system is improved.

Other object or advantages of the technology disclosed in the present disclosure will be clear through an embodiment which will be described later or the detailed description based on the appended drawings.

BRIEF DESCRIPTION OF DRAWINGS

FIG. 1 is a diagram illustrating seven TDD configurations 0 to 6 defined in LTE (TS36.211 Table 4.2-2) the ascending order of the number of downlink sub frames and the descending order of the number of uplink sub frames.

FIG. 2 is a diagram illustrating sub frames in which an uplink and a downlink are mismatched between configurations vertically adjacent to each other in FIG. 1.

FIG. 3 is a diagram illustrating sub frames in which the uplink and the downlink are mismatched between configurations vertically adjacent to each other in FIG. 23.

FIG. 4 is a diagram illustrating an example in which configurations 2 and 3 which have the same number of downlink sub frames in FIG. 1 are switched.

FIG. 5 is a diagram illustrating sub frames in which the uplink and the downlink are mismatched between configurations vertically adjacent to each other in FIG. 4.

FIG. 9 is a diagram illustrating an example in which interference is avoided by stopping a downlink transmission of a base station through a sub frame specified to interfere between configurations adjacent to each other in FIG. 5.

FIG. 23 is a diagram illustrating seven TDD configurations 0 to 6 defined in LTE (TS36.211 Table 4.2-2).

MODE FOR CARRYING OUT THE INVENTION

Figure 6:
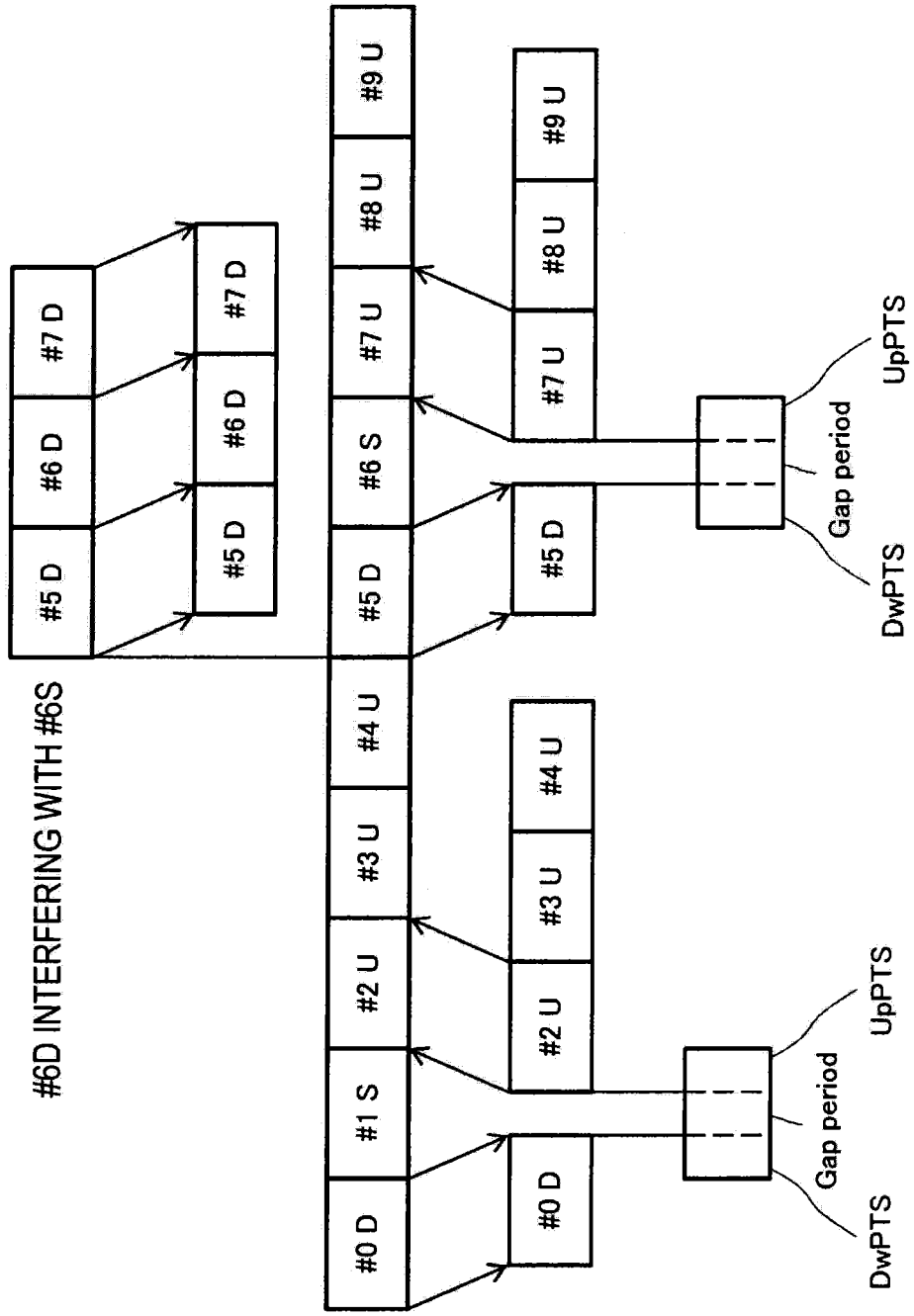
FIG. 6 is a diagram illustrating a configuration 0 re-drawn from a point of view of an eNodeB side.

Hereinafter, an embodiment of the technology disclosed in the present disclosure will be described in detail with reference to the appended drawings.

FIG. 23 illustrates the seven TDD configurations 0 to 6 defined in the LTE (TS36.211 Table 4.2-2). As described above, the sub frame #0 is fixedly allocated to the downlink in all of the configurations, the sub frame #1 is fixedly allocated to the special sub frame in all of the configurations, the sub frame #2 is fixedly allocated to the uplink in all of the configurations, and the sub frame #5 is fixedly allocated to the downlink in all of the configurations. When different TDD configurations are used in neighboring eNodeBs, it is likely that in the sub frame #3, #4, and #6 to #9 other than the above-mentioned sub frames, the uplink and the downlink are mismatched, and thus interference occurs.

The operator can change the ratio of the uplink and the downlink in the radio frame through the configuration to be used. The following Table 1 represents the number of downlink sub frames and the number of uplink sub frames of each configuration.

TABLE 1

| Configuration | Number of downlink sub frames | Number of uplink sub frames |
|---|---|---|
| 0 | 2 | 6 |
| 1 | 4 | 4 |
| 2 | 6 | 3 |
| 3 | 6 | 4 |
| 4 | 7 | 2 |
| 5 | 8 | 1 |
| 6 | 3 | 5 |

It can be understood from Table 1 that the seven TDD configurations 0 to 6 defined in the LTE (TS36.211 Table 4.2-2) are not arranged in order of the number of downlink sub frames or the number of uplink sub frames. Here, Table 2 represents that the configurations 0 to 6 are arranged in the ascending order of the number of downlink sub frames and the descending order of the number of uplink sub frames.

TABLE 2

| Configuration | Number of downlink sub frames | Number of uplink sub frames |
|---|---|---|
| 0 | 2 | 6 |
| 6 | 3 | 5 |
| 1 | 4 | 4 |
| 3 | 6 | 3 |
| 2 | 6 | 2 |
| 4 | 7 | 2 |
| 5 | 8 | 1 |

Here, the seven TDD configurations 0 to 6 defined in the LTE (TS36.211 Table 4.2-2) illustrated in FIG. 23 are rearranged in the ascending order of the number of downlink sub frames and the descending order of the number of uplink sub frames according to Table 2. The result is illustrated in FIG. 1.

When different TDD configurations are used in neighboring eNodeBs, the configurations are assumed to be changed between neighboring eNodeBs only in the order illustrated in FIG. 1 (that is, only in the order of the serial numbers 0, 6, 1, 3, 2, 4, and 5). In this case, configurations used by neighboring eNodeBs have a combination (that is, one of combinations of the serial numbers 0 and 6, 6 and 1, 1 and 3, 3 and 2, 2 and 4, and 4 and 5) of configurations vertically adjacent to each other in FIG. 1. Between neighboring cells, the ratio of the uplink and the downlink in the radio frame gently changes.

Figure 2:
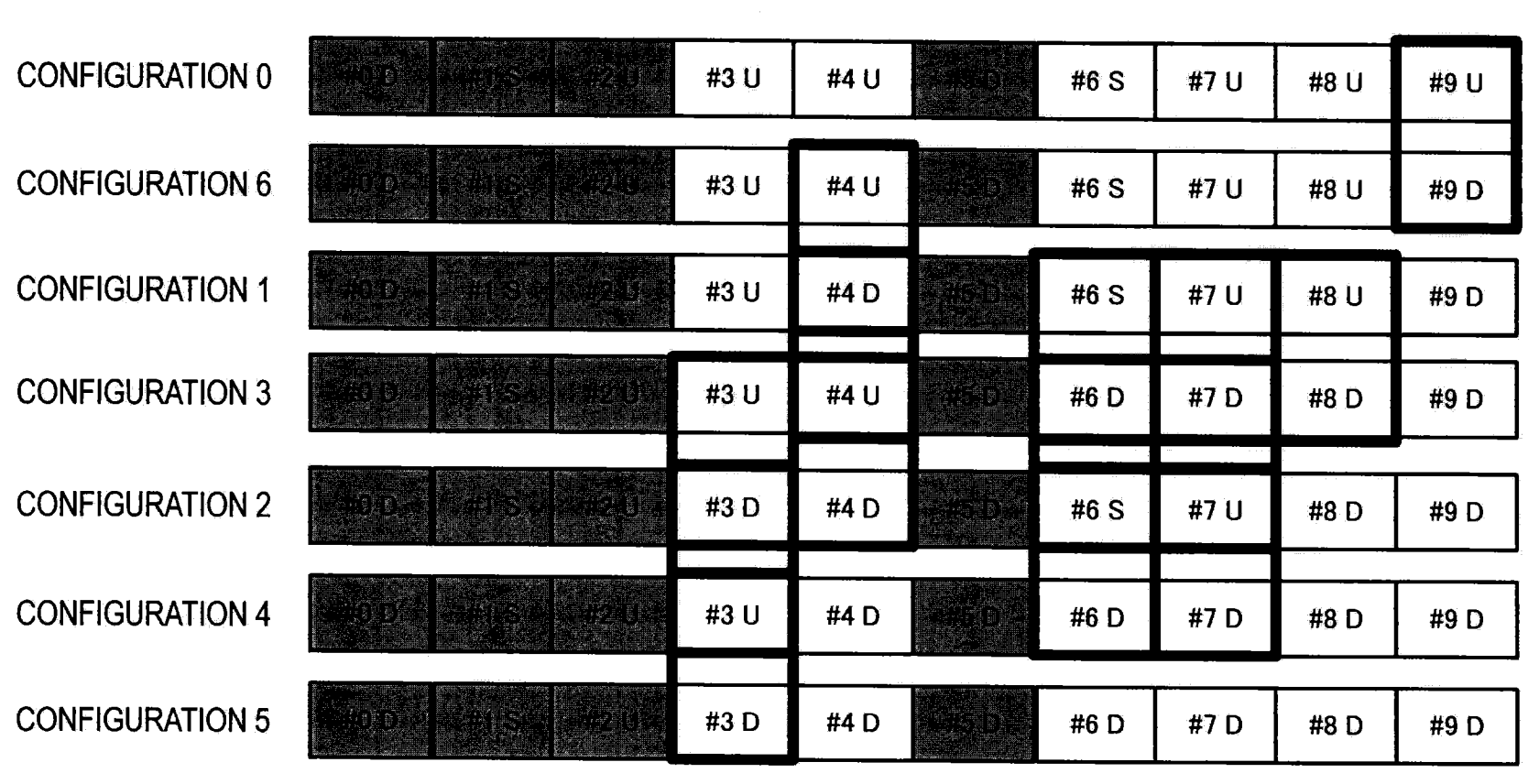

When different TDD configurations are used in neighboring eNodeBs, it is likely that in the sub frame #3, #4, and #6 to #9, the uplink and the downlink are mismatched, and thus interference occurs. In FIG. 2, sub frames in which the uplink and the downlink are mismatched between configurations vertically adjacent to each other in FIG. 1 are surrounded by thick lines. Referring to FIG. 2, between the configuration 0 and the configuration 6, since the uplink and the downlink are mismatched only in the sub frame #9, only one sub frame is likely to cause interference. The number of sub frames causing interference between configurations vertically adjacent to each other in FIG. 1 (that is, combinations of configurations of the serial numbers 0 and 6, 6 and 1, 1 and 3, 3 and 2, 2 and 4, and 4 and 5) is represented by the following Table 3.

TABLE 3

| Combinations of adjacent configurations | Number of sub frames causing interference |
|---|---|
| 0-6 | 1 |
| 6-1 | 1 |
| 1-3 | 4 |
| 3-2 | 4 |
| 2-4 | 3 |
| 4-5 | 1 |

Referring to Table 3, it can be understood that when configurations of combinations of the serial numbers 1 and 3, 3 and 2, and 2 and 4 are used between neighboring eNodeBs, the number of sub frames causing interference is large. Therefore, when different TDD configurations are used in neighboring eNodeBs, if configurations used by neighboring eNodeBs have one of combinations of 1 and 3, 3 and 2, and 2 and 4, there is a problem in that interference is large.

Figure 3:
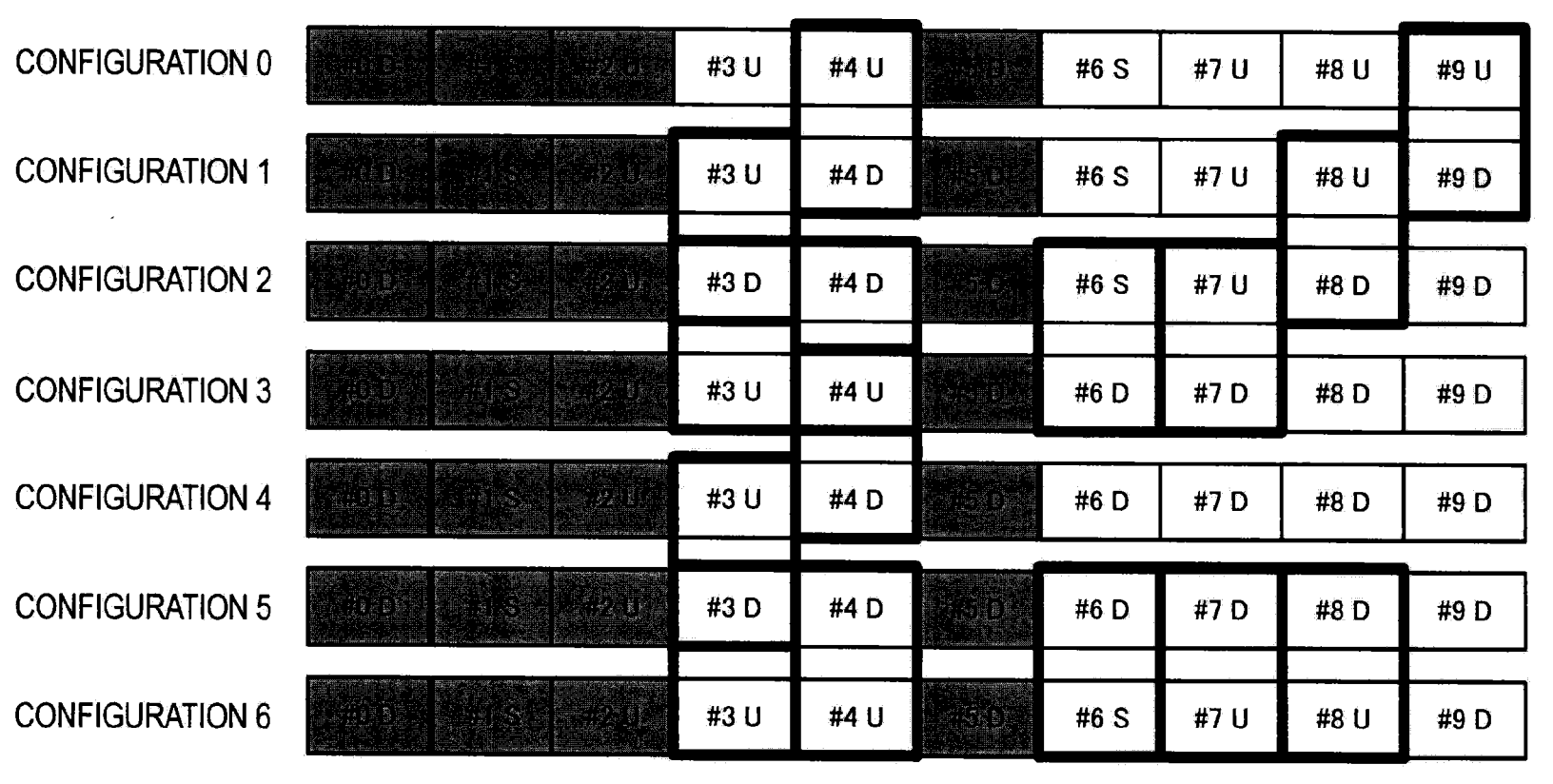

For the sake of comparison, an example in which the above-described rearranging of the configurations is not performed, and sub frames in which the uplink and the downlink are mismatched between configurations vertically adjacent to each other in FIG. 23 are surrounded by thick lines is illustrated in FIG. 3. The following Table 4 represents the number of sub frames causing interference between configurations vertically adjacent to each other in FIG. 20 (combinations of configurations of the serial numbers 0 and 6, 6 and 1, 1 and 3, 3 and 2, 2 and 4, and 4 and 5).

TABLE 4

| Combinations of adjacent configurations | Number of sub frames causing interference |
|---|---|
| 0-1 | 2 |
| 1-2 | 2 |
| 2-3 | 4 |
| 3-4 | 1 |
| 4-5 | 1 |
| 5-6 | 5 |

Referring to Table 4, it can be understood that when configurations of a combination of the serial numbers 2 and 3 or 5 and 6 are used in neighboring cell, the number of sub frames causing interference is large. When FIG. 2 and Table 3 are compared with FIG. 3 and Table 4, respectively, as the configurations are rearranged in the ascending order of the number of downlink sub frames and the descending order of the number of uplink sub frames, the number of sub frames causing interference decreases. Since a maximum of the number of sub frames causing interference between adjacent configurations is reduced through the rearrangement, the throughput of a cell is not significantly reduced.

Referring back to Table 3, when the configurations are rearranged in the ascending order of the number of downlink sub frames and the descending order of the number of uplink sub frames, the number of sub frames causing interference increases in the combinations of the configurations of the serial numbers 1 and 3, 3 and 2, and 2 and 4. When an almost blank sub frame (ABS) is used as intercell interference coordination (ICIC), any one of neighboring eNodeBs stops transmission in a sub frame causing interference. Therefore, when the combinations of the configurations of the serial numbers 1 and 3, 3 and 2, and 2 and 4 are used in neighboring eNodeBs, the throughput of a cell is significantly reduced.

FIG. 1 and Table 2 represent a result of rearranging the seven TDD configurations 0 to 6 defined in the LTE (TS36.211 Table 4.2-2) in the ascending order of the number of downlink sub frames and the descending order of the number of uplink sub frames. Here, an attempt to rearrange the configurations 0 to 6 only in the ascending order of the number of downlink sub frames without applying the descending order of the number of uplink sub frames has been made. Specifically, the configurations 2 and 3 which are the same in the number of downlink sub frames in FIG. 1 and Table 2 are switched as illustrated in FIG. 4 and the following Table 5.

TABLE 5

| Configurations | Number of downlink sub frames | Number of uplink sub frames |
|---|---|---|
| 0 | 2 | 6 |
| 6 | 3 | 5 |
| 1 | 4 | 4 |
| 2 | 6 | 2 |
| 3 | 6 | 3 |
| 4 | 7 | 2 |
| 5 | 8 | 1 |

Figure 5:
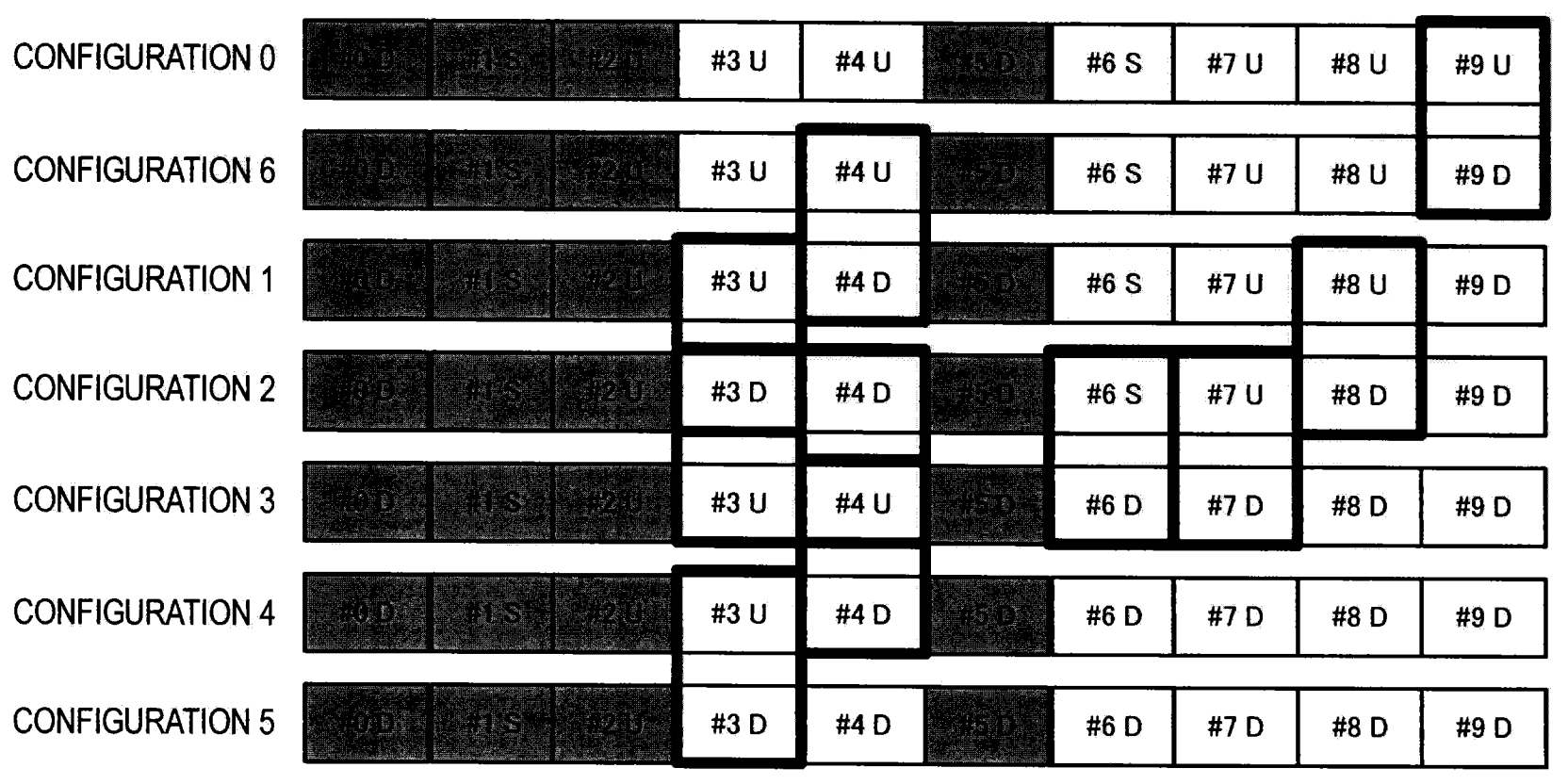

In FIG. 5, sub frames in which the uplink and the downlink are mismatched between configurations vertically adjacent to each other in FIG. 4 are surrounded by thick lines. The following Table 6 represents the number of sub frames causing interference between the configurations vertically adjacent to each other in FIG. 4 (that is, combinations of configurations of the serial numbers 0 and 6, 6 and 1, 1 and 2, 2 and 3, 3 and 4, and 4 and 5).

TABLE 6

| Combinations of adjacent configurations | Number of sub frames causing interference |
|---|---|
| 0-6 | 1 |
| 6-1 | 1 |
| 1-2 | 2 |
| 2-3 | 4 |
| 3-4 | 1 |
| 4-5 | 1 |

When FIG. 2 and Table 5 are compared with FIG. 3 and Table 6, respectively, as the configurations 0 to 6 are rearranged only in the ascending order of the number of downlink sub frames without applying the descending order of the number of uplink sub frames, the number of sub frames causing interference is further reduced. However, referring to Table 6, when a combination of the configurations 2 and 3 is used in neighboring eNodeBs, the number of sub frames causing interference is still large, that is, 4.

Until now, the description has been made focusing on a sub frame causing interference in a radio frame when different TDD configurations are used in neighboring eNodeBs. In the following, a technique of avoiding interference in a sub frame in which interference occurs will be further described.

In the past, techniques of removing interference when interference occurs by a method of adjusting transmission output of a transmitter causing interference, a method of stopping transmission of a transmitter, a method of dividing sub carriers in the frequency direction and performing multiplexing, or the like have been known. On the other hand, an embodiment disclosed in the present disclosure does not focus attention on a method of removing interference. For example, in the 3GPP Rel 10, in order to reduce influence of interference between neighboring cells, ABS (Almost Blank Sub frame) is specified as ICIC (InterCell Interference Coordination). A method of further avoiding interference an ABS will be described below.

An ABS is a technique of stopping transmission of user data, and for example, a specific sub frame of an eNodeB causing interference is used as an ABS. Even when transmission of user data stops, a reference signal slightly remains. A method of stopping the reference signal has been proposed as well. That is, an ABS is a simple interference avoiding technique of stopping transmission when interference occurs. An ABS is considered to be likely to be used in the ICIC of the TDD being discussed in the 3GPP Rel 11.

FIG. 5 illustrates the seven TDD configurations 0 to 6 defined in the LTE (TS36.211 Table 4.2-2) are arranged such that the number of downlink sub frames gently increases as described above. FIG. 5 is a drawing re-drawn from a point of view of an eNodeB.

Further, in the TDD, it is necessary to secure a time to switch the downlink and the uplink as described above. For this reason, when an allocation of a sub frame switches from the downlink to the uplink, a special sub frame is inserted as a guard time.

FIG. 6 illustrates the configuration 0 re-drawn from a point of view of an eNodeB. A downlink signal of an eNodeB is subjected to a propagation delay in space and a processing delay in a UE and thus delayed compared to a downlink position of a format until reception of the downlink signal is completed by the UE. Meanwhile, in order for an uplink signal of a UE to reach an eNodeB up to an uplink position of a format, a UE needs to start transmission of the uplink signal before the uplink position of the format. A special sub frame is defined by an area DwPTS by a delay of a downlink signal, an area UpPTS corresponding to a degree by which an uplink signal is transmitted early, and a gap (gap period) between the two areas as illustrated in FIG. 6.

Figure 7:
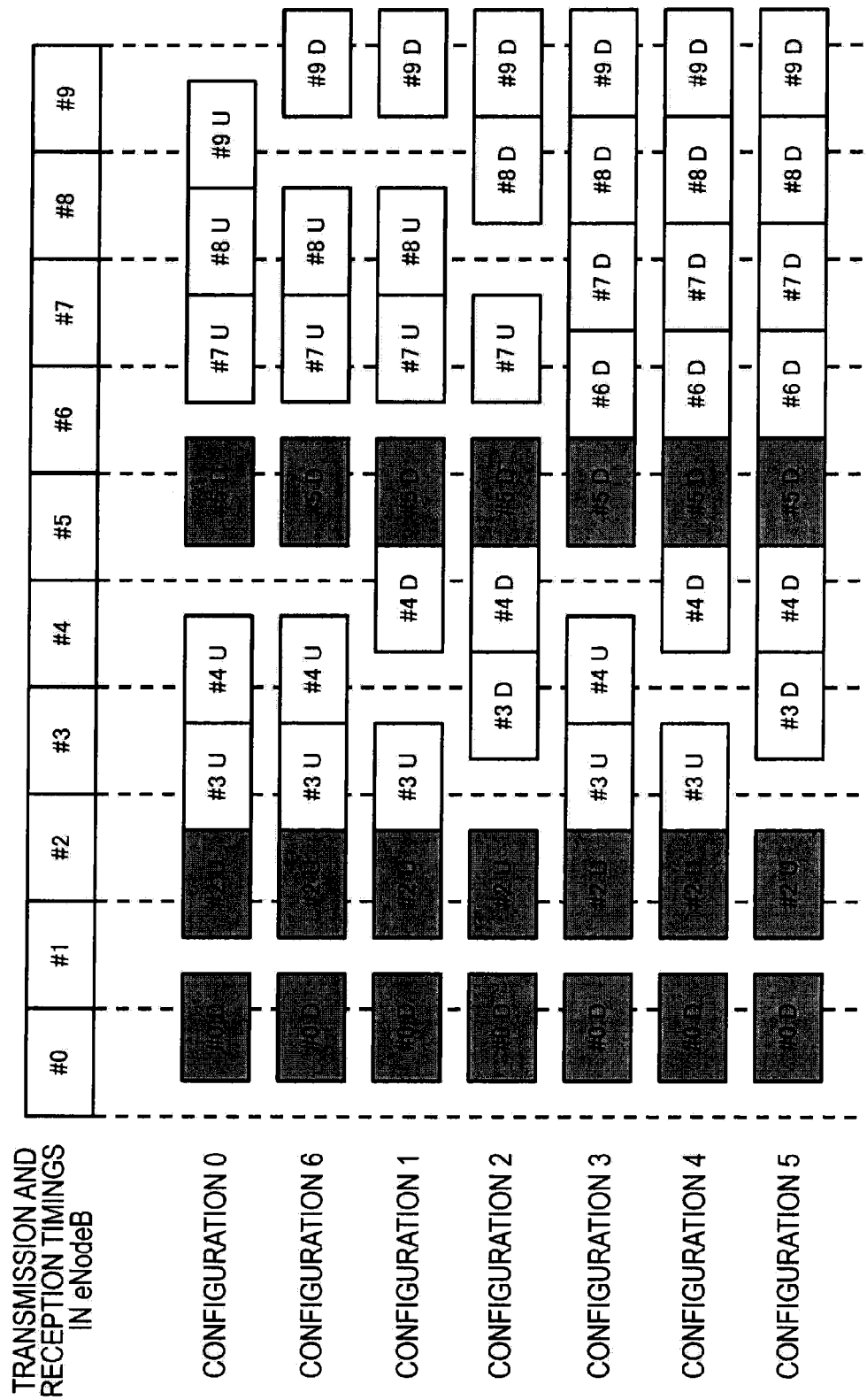
FIG. 7 is a diagram illustrating configurations of FIG. 5 re-drawn from a point of view of a terminal side in view of a delay of a downlink signal and a degree by which an uplink signal is transmitted early.
Figure 8:
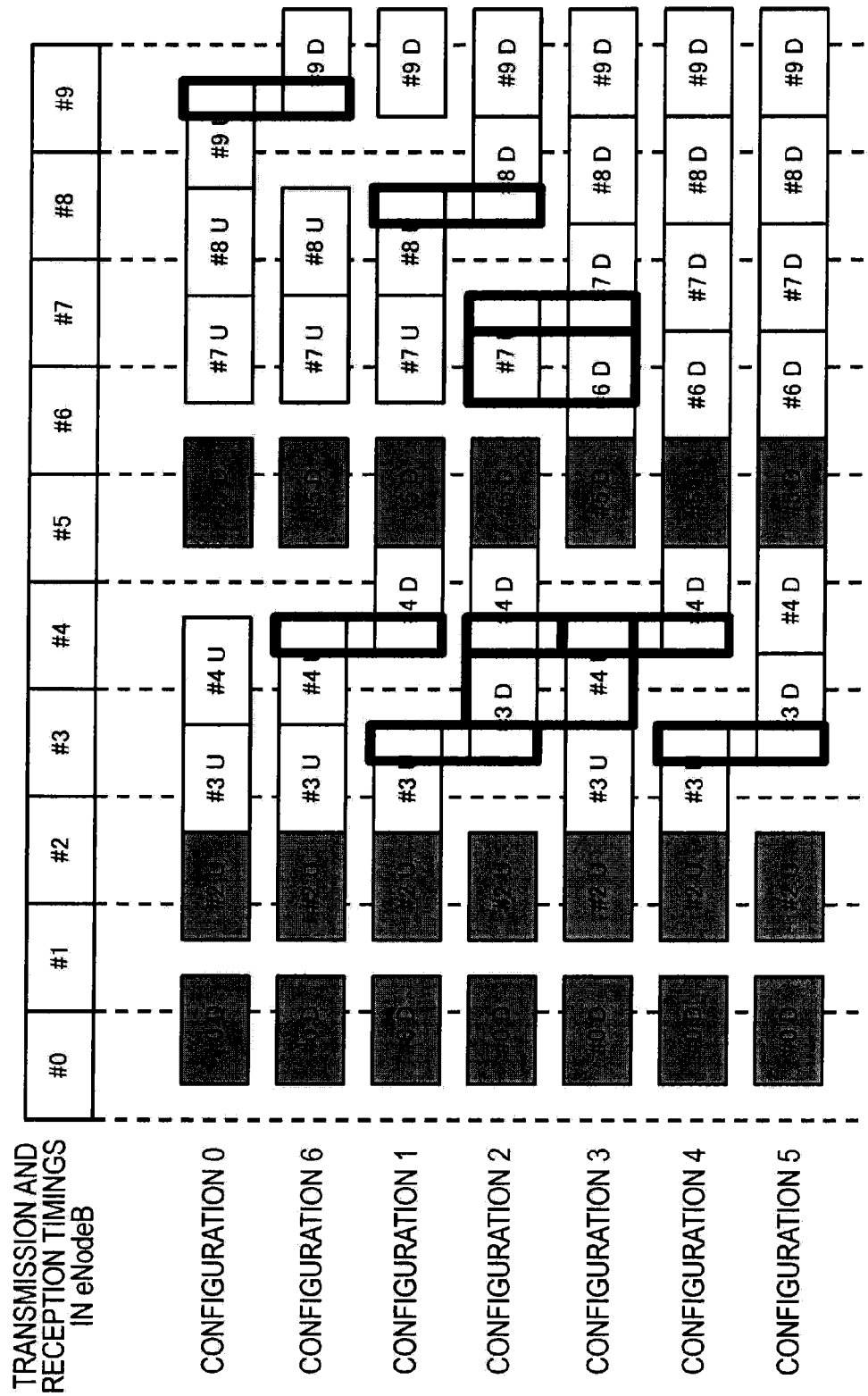
FIG. 8 is a diagram illustrating sub frames in which the uplink and the downlink are mismatched between configurations vertically adjacent to each other in FIG. 7.

Further, the configurations illustrated in FIG. 5 are redrawn in FIG. 7 from a point of view of a terminal in view of a delay of a downlink signal and a degree by which an uplink signal is transmitted early. In FIG. 8, sub frames in which the uplink and the downlink are mismatched between configurations vertically adjacent to each other in FIG. 7 are surrounded by thick lines.

When interference at a terminal side is avoided using an ABS, a portion whose transmission or reception has to stop is unclear. Further, when the number of portions used as an ABS increases uselessly, the throughput of the entire system deteriorates. Simply, when any one of the followings (1) to (6) is appropriately used, interference of portions surrounded by thick lines in FIG. 8 can be avoided.

(1) all downlink sub frames causing interference are used as an ABS.

(2) all uplink sub frames causing interference are used as an ABS.

(3) transmission from a UE through a first half portion of an uplink sub frame causing interference is stopped (4) transmission from a UE through a second half portion of an uplink sub frame causing interference is stopped (5) reception from a UE through a first half portion of a downlink sub frame causing interference is stopped (6) reception from a UE through a second half portion of a downlink sub frame causing interference is stopped Further, when an ABS setting at a base station side does not match an ABS setting at a terminal side, since an ABS is uselessly applied, the throughput of the entire system deteriorates.

FIG. 5 illustrates an example in which sub frames in which the uplink and the downlink are mismatched are surrounded by thick lines from a point of view of a base station side. Referring to FIG. 5, interference can be avoided in a sub frame causing interference at a base station only when reception or transmission is stopped on all sub frames of either of the uplink and the downlink. In other words, in order to avoid interference at a base station, an ABS has to be applied to all sub frames causing interference.

Meanwhile, as can be understood from FIG. 8, interference at a terminal can be avoided even when an ABS is applied to a first half portion of a sub frame or even when an ABS is applied to a second half portion of a sub frame as well as when an ABS is applied to all sub frames causing interference.

In short, a position to which an ABS is applied depends on whether interference between base stations is desired to be reduced, interference between terminals is desired to be reduced, or interference is desired to be reduced in both a base station and a terminal.

Figure 9:
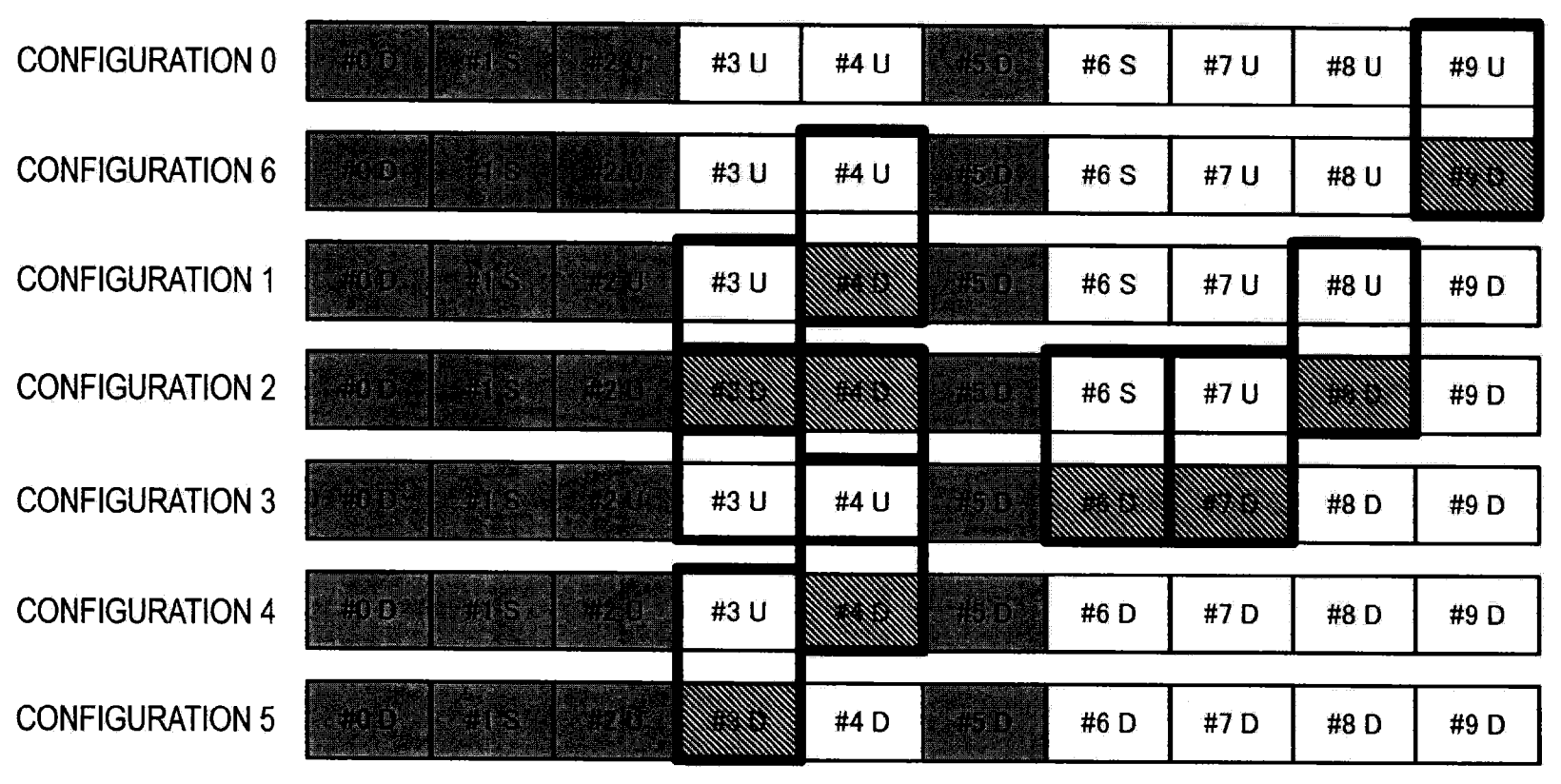

When interference at a base station is desired to be reduced, for example, it is desirable to apply an ABS to sub frames of either of the downlink and the uplink among portions causing interference at a base station side which are surrounded by thick lines in FIG. 5. FIG. 9 illustrates an example in which interference is avoided such that downlink transmission of a base station is stopped in a sub frame specified to cause interference between adjacent configurations in FIG. 5. In FIG. 9, positions in which downlink transmission of a base station is stopped (that is, an ABS is arranged) are represented by hatching.

Further, when interference at a terminal is desired to be reduced, for example, it is desirable to stop either transmission or reception of a terminal in portions causing interference at a terminal side which are surrounded by thick lines in FIG. 8.

Figure 10:
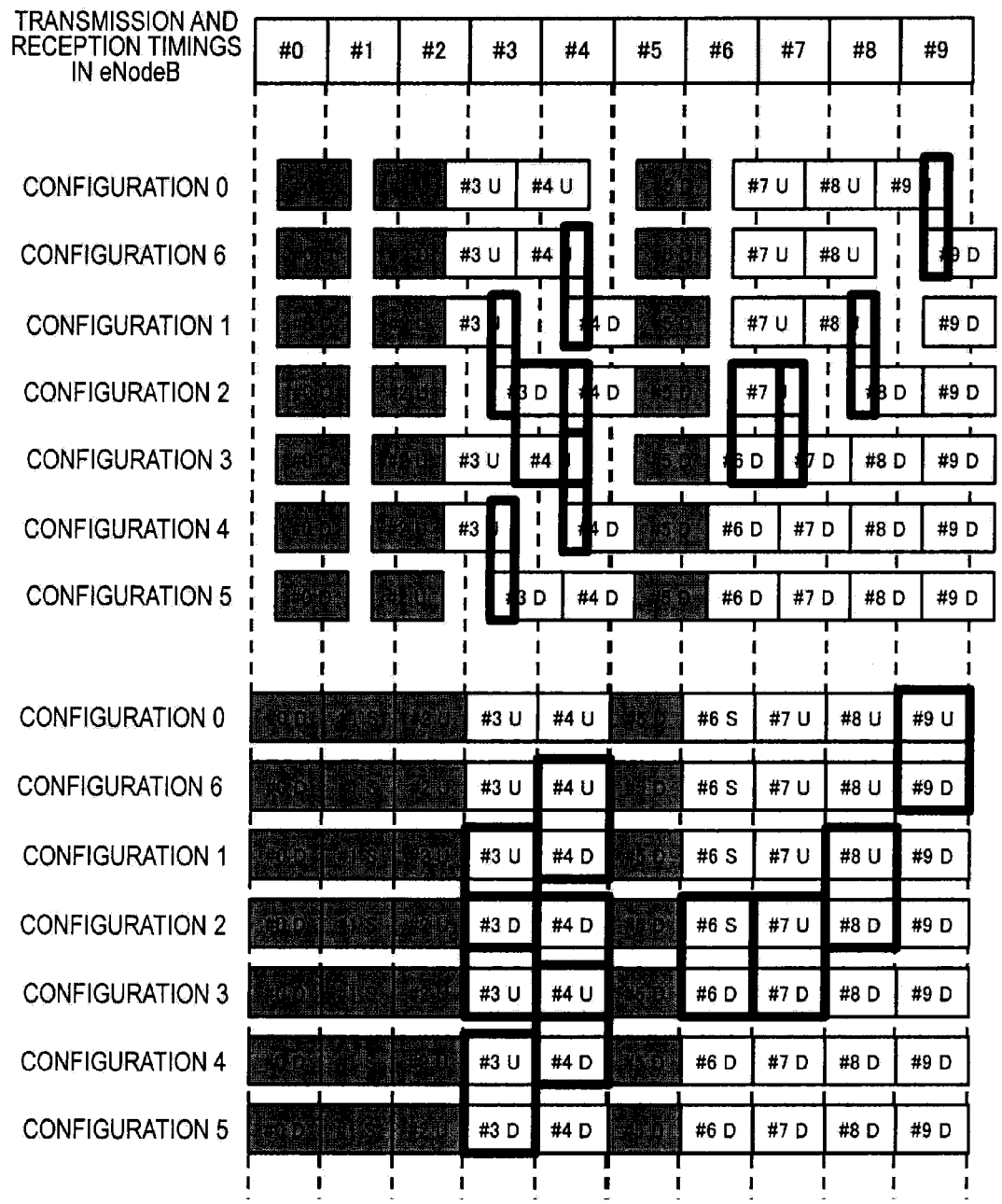
FIG. 10 is a diagram illustrating FIG. 8 illustrating an interference portion from a point of view of a terminal side and FIG. 5 illustrating an interference portion from a point of view of a base station side together.

Further, when interference is desired to be reduced in both at a base station side and at a terminal side, basically, it is desirable to stop the same portion as interference between base stations is reduced. FIG. 10 illustrates FIG. 8 illustrating interference portions at a point of view of a terminal side and FIG. 5 illustrating interference portions at a point of view of a base station side are illustrated in the upper portion and the lower portion, respectively. It can be understood from FIG. 10 that a number of a sub frame causing interference at a point of view of a base station is the same as that at a point of view of a terminal. Thus, it is desirable to stop the same portions as interference between base stations is reduced.

Even in any of the above-described cases, that is, whether interference is desired to be reduced either or both of between base stations and between terminals, it is necessary to select whether interference is to be considered according to an operation form of a cellular communication system. For example, when base stations are apart from each other, but terminals located in cells of the respective base stations are close to each other, selection to reduce interference between the terminals needs to be made. However, when two Home eNodeBs are close to each other, but terminals located in respective cells are apart from each other or when transmission power of terminals is weak and there is no problem, only interference between base stations may be considered.

Here, when only interference between base stations is considered, the consequence is the same as both interference between base stations and interference between terminals are considered. As can be understood from FIG. 10, it is because when only interference between terminals, interference may be avoided by stopping transmission or reception of a terminal partially in a first half portion or a second half portion of a sub frame, but when interference between base stations is considered, transmission or reception has to be stopped in all sub frames.

Interference from a point of view of a terminal side will be reviewed with reference back to FIG. 8. The sub frame #7 allocated to the uplink of the configuration 2 causes interference to the second half portion of the sub frame #6 and the first half portion of the sub frame #7 allocated to the downlink of the neighboring configuration 3. That is, it is a problem in that a single sub frame causes interference to two sub frames.

When a single sub frame causes interference to two sub frames as described above, it is desirable to apply an ABS to the single sub frame and stop transmission or reception thereof. In the example illustrated in FIG. 8, transmission of a terminal through the sub frame #7 allocated to the uplink is stopped in the cell using the configuration 2. Thus, at the neighboring cell side using the configuration 3, the terminal can receive a downlink signal through the sub frames #6 and #7 allocated to the downlink.

Figure 11:
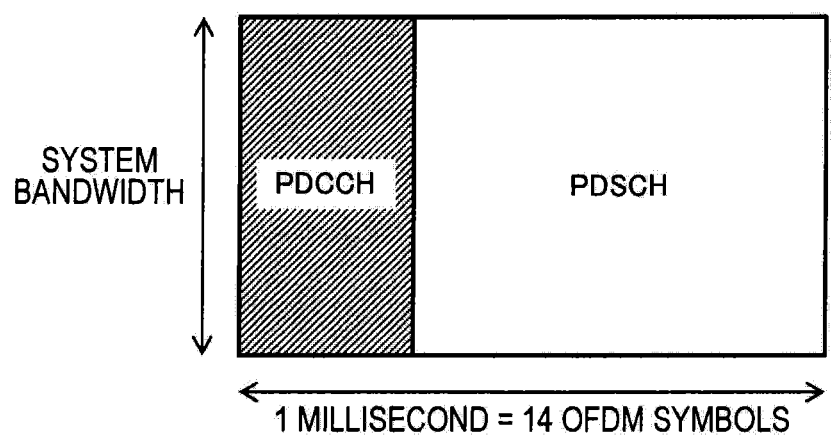
FIG. 11 is a diagram schematically illustrating a format of a downlink signal.

FIG. 11 schematically illustrates a format of a downlink signal. In FIG. 11, a vertical axis represents a system bandwidth, and a horizontal axis is a time axis and represents 1 millisecond corresponding to 14 OFDM symbols. As illustrated in FIG. 11, a control signal PDCCH (Phy Downlink) from a base station is inserted into a first half portion of a downlink signal indicated by hatching, and a PDSCH (Phy Downlink Shared Channel) used as user data follows the control signal. For this reason, when "reception from a UE through a first half portion of a downlink sub frame causing interference is stopped" is applied among the methods of avoiding interference at a terminal side, there is a problem in that it is difficult for a terminal to acquire the control signal from the base station.

Figure 12:
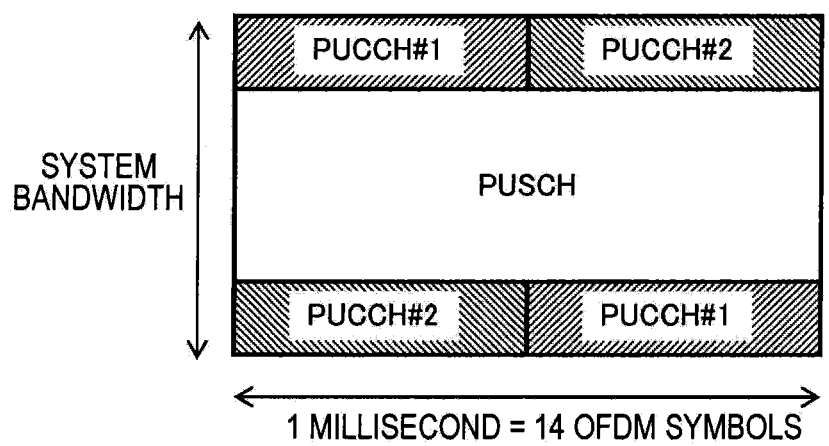
FIG. 12 is a diagram schematically illustrating a format of an uplink signal.

FIG. 12 schematically illustrates a format of an uplink signal. In FIG. 12, a vertical axis represents a system bandwidth, and a horizontal axis is a time axis. As illustrated in FIG. 12, in an uplink signal, a PUSCH (Phy Uplink Shared Channel) used as user data is allocated to a middle portion of a system bandwidth, and a PUCCH (Phy Uplink Control Channel) used as a control signal is allocated to both end portions indicated by hatching. Here, PUCCH #1 and PUCCH #2 indicated by the same hatching form represent the same data. A diversity effect is obtained such that PUCCH#1 and PUCCH#2 are alternately arranged in the first portion and the second portion of each end portion.

Interference from a point of view of a terminal side will be reviewed with reference back to FIG. 8. The second half portion of the sub frame #4 allocated to the uplink of the configuration 6 interferes with the first half portion of the sub frame #4 allocated to the downlink of the neighboring configuration 1.

Figure 13:
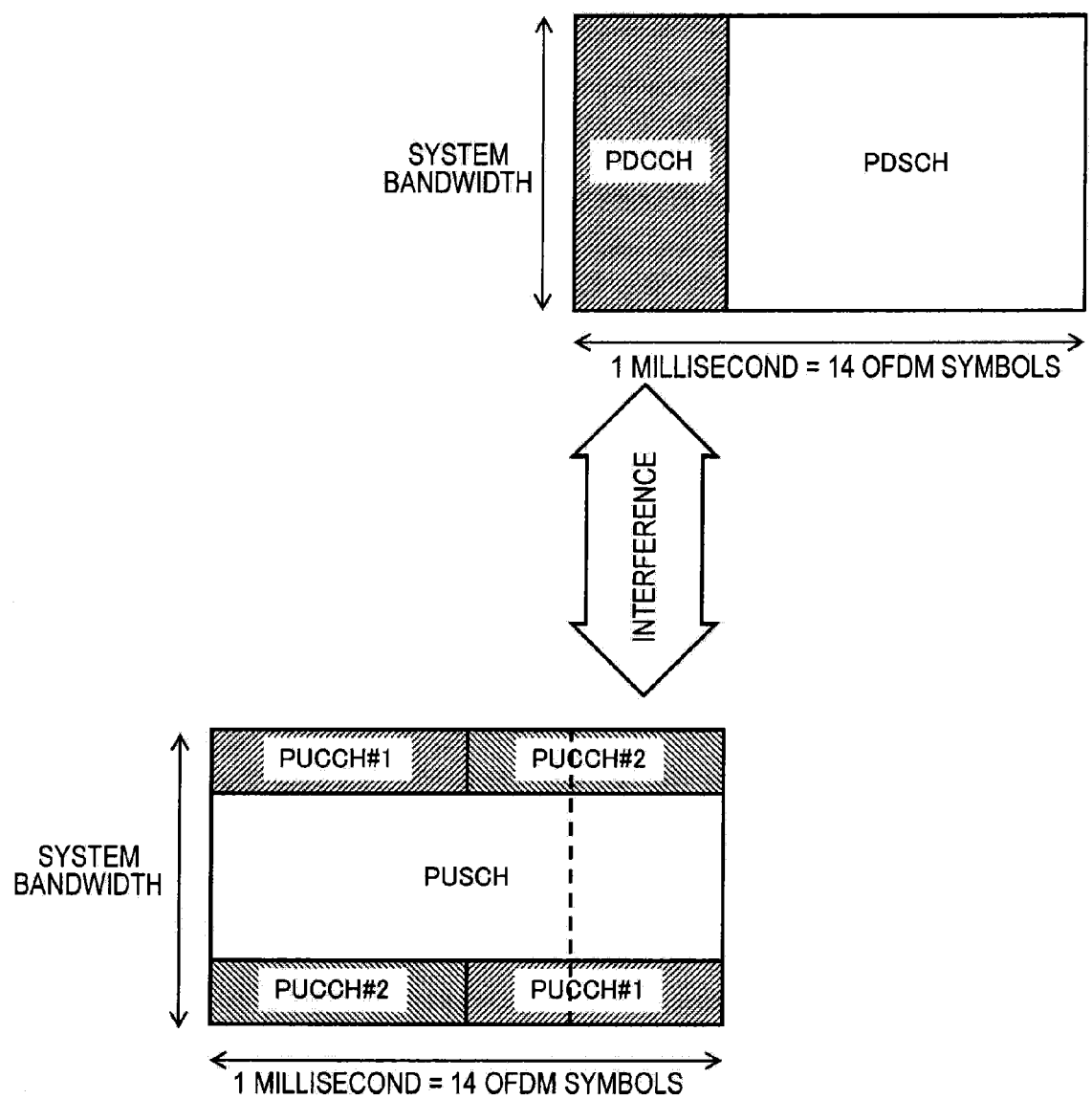
FIG. 13 is a diagram illustrating an example in which a first half portion of a downlink signal interferes only with a second half portion of an uplink signal of a neighboring cell.
Figure 14:
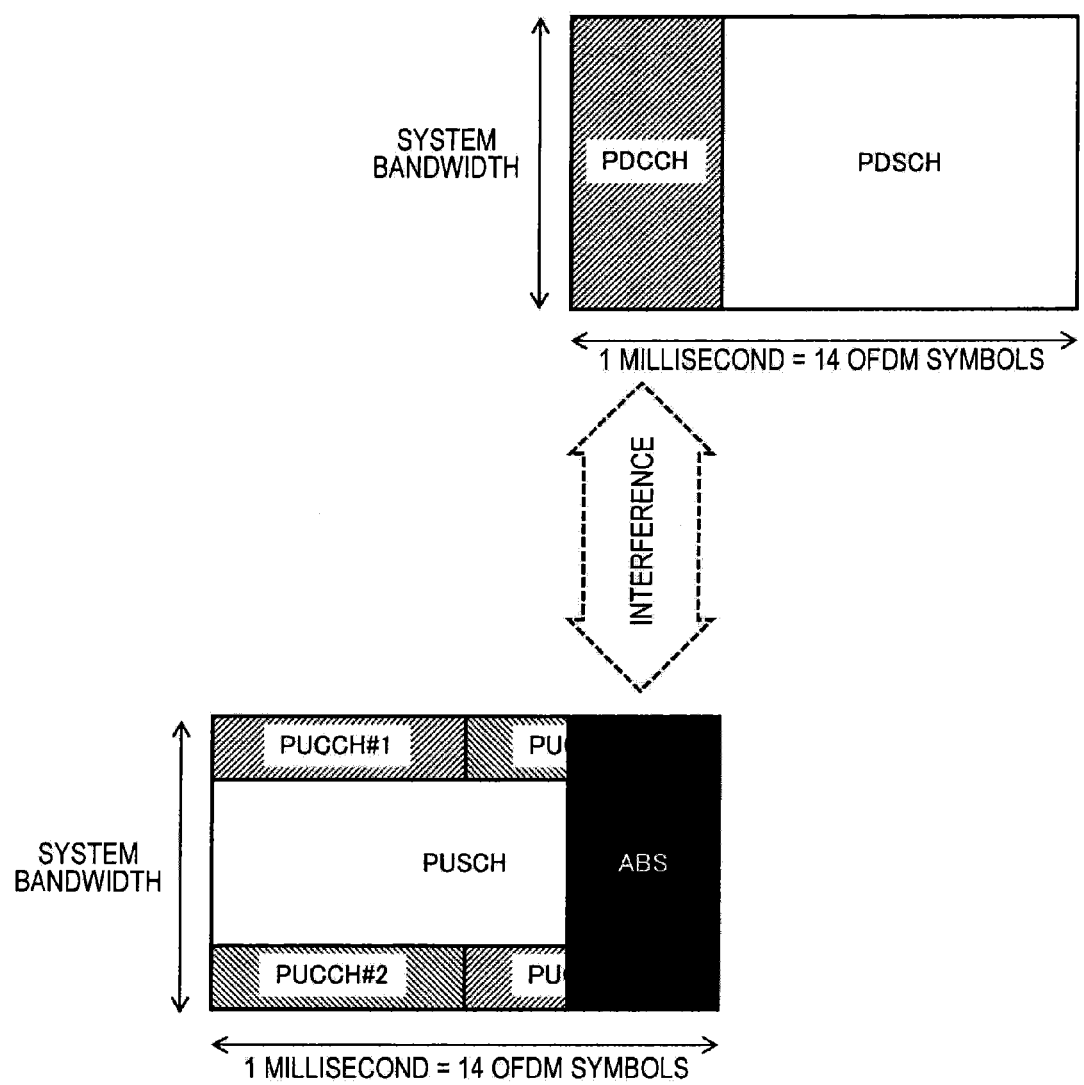
FIG. 14 is a diagram illustrating a format in which an ABS is set to a second half portion of an uplink signal when a first half portion of a downlink signal interferes only with a second half portion of an uplink signal of a neighboring cell.

FIG. 13 illustrates an example in which when only a first half portion of a downlink signal suffers interference, the downlink signal interferes only with a second half portion of an uplink signal of a neighboring cell. As described above, when a terminal stops reception through a first half portion of a downlink sub frame, there is a problem in that it is difficult to acquire a control signal PDCCH from a base station. Therefore, a format in which an ABS is set to a second half portion of an uplink signal as illustrated in FIG. 14 is an appropriate method of avoiding interference.

Figure 22:
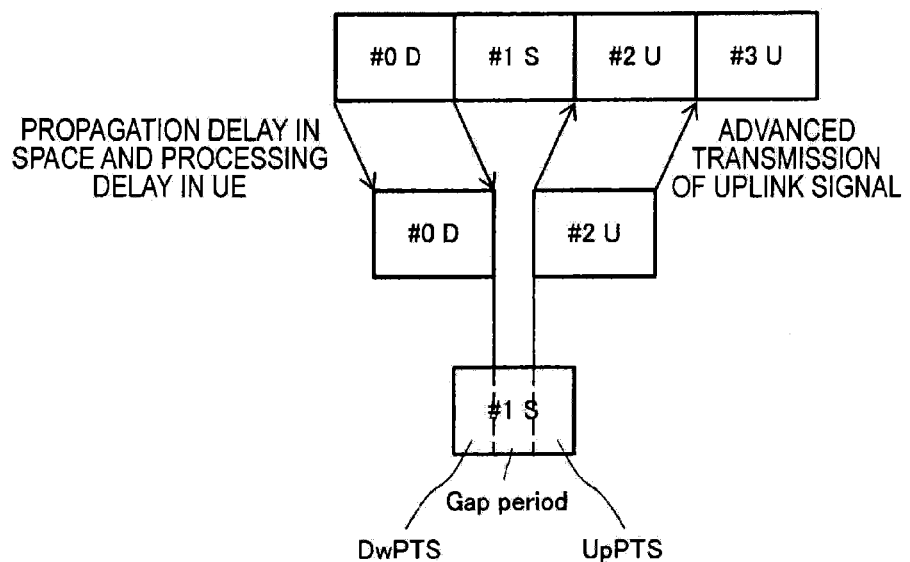
FIG. 22 is a diagram illustrating an example in which a special sub frame is inserted when switching from a downlink to an uplink is performed between a sub frame #0 and a sub frame #2.
Figure 24:
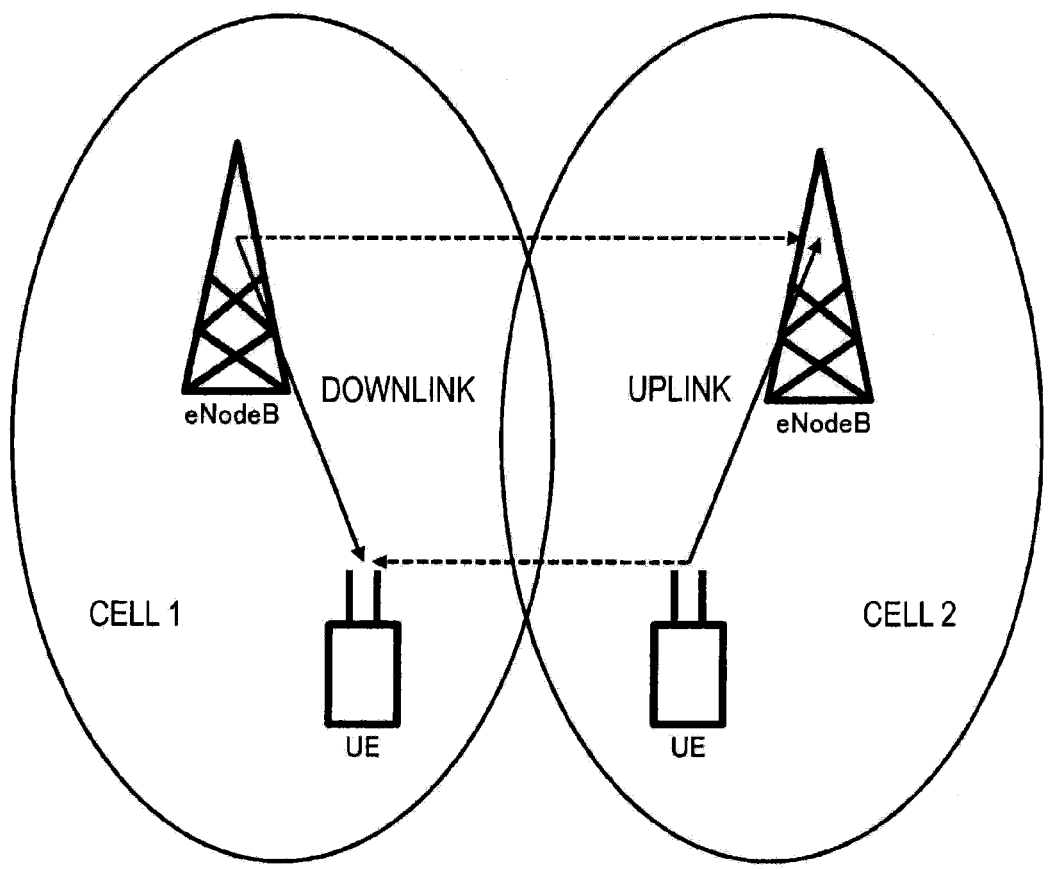
FIG. 24 is a diagram illustrating an example in which links of different directions such as an uplink and a downlink are allocated at positions of same sub frames of neighboring eNodeBs.
Figure 25:
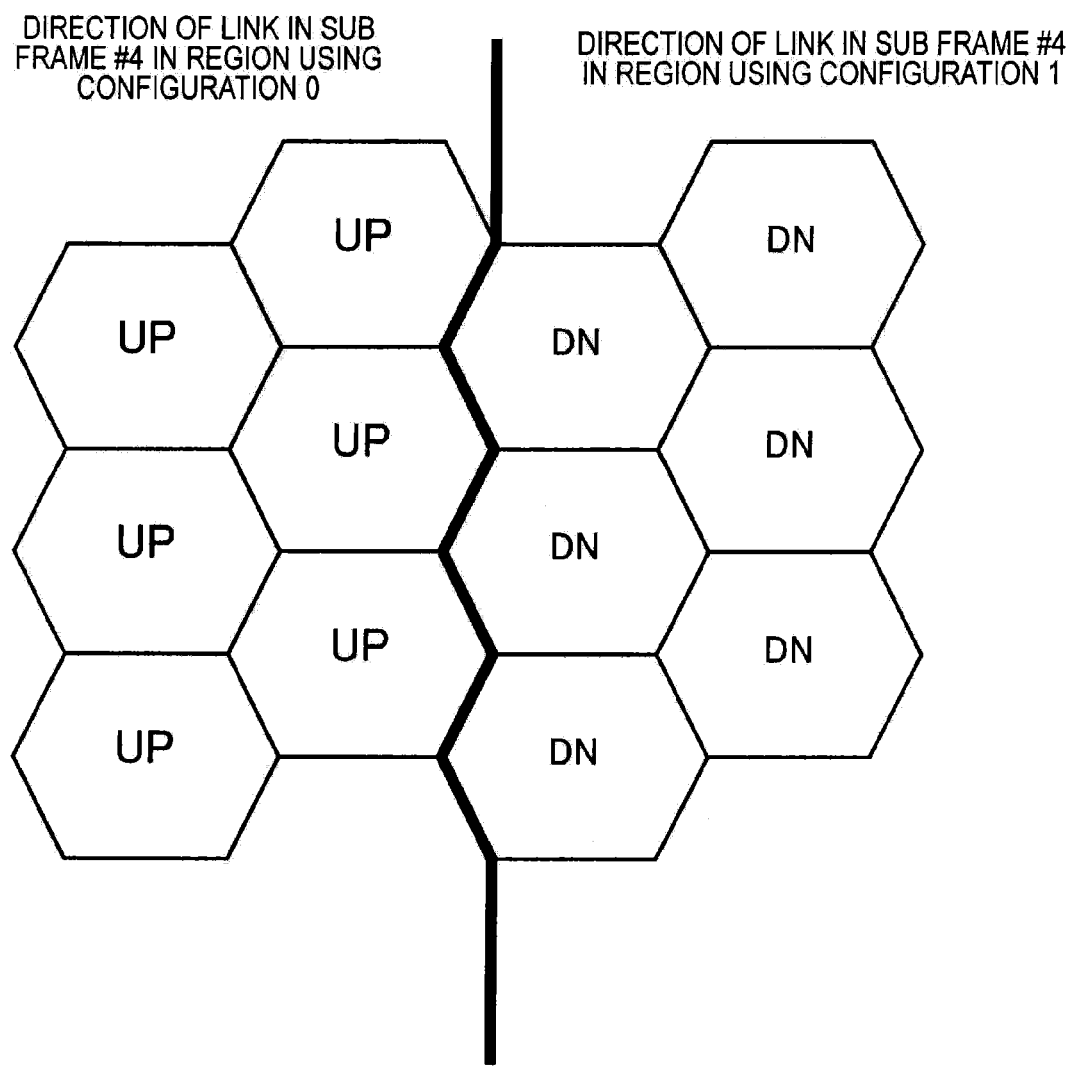
FIG. 25 is a diagram illustrating an example in which different TDD configurations are used in relative large areas.
Figure 26:
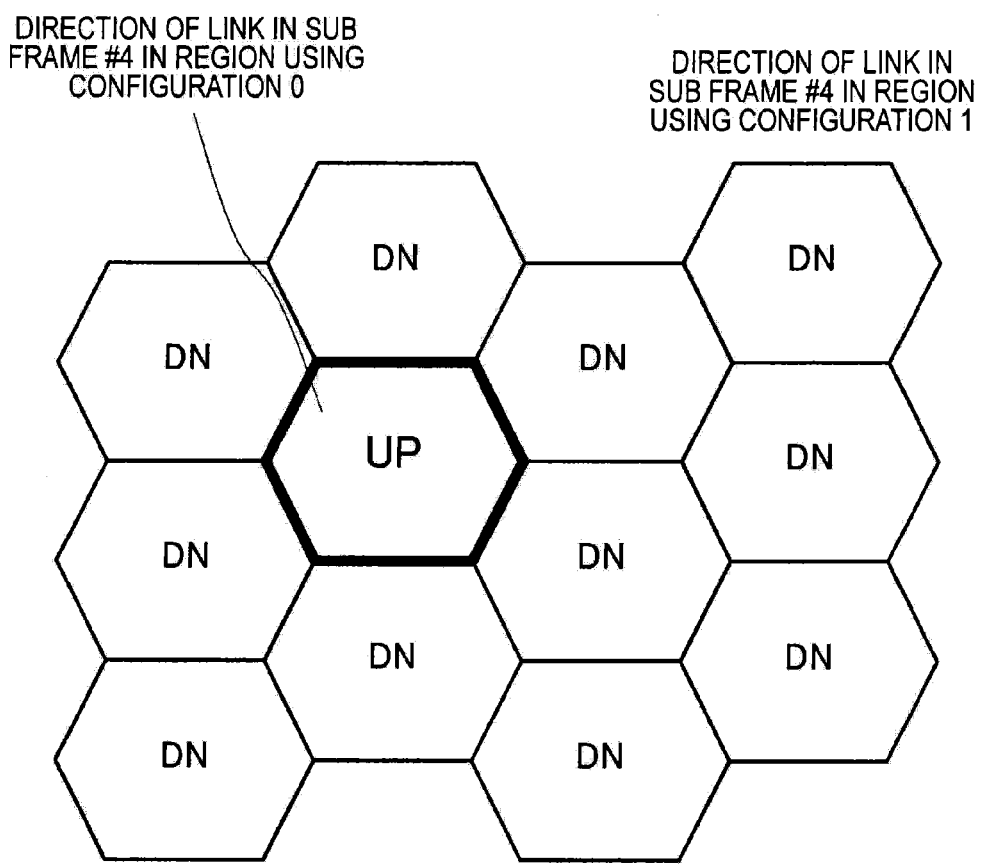
FIG. 26 is a diagram illustrating an example in which cells using different TDD configurations are located a spot-like manner.

Further, for a terminal, a downlink signal is delayed due to a propagation delay in space and a processing delay in a terminal until reception is completed, and an uplink signal has to be transmitted early in order to reach a base station up to an uplink position of a format (see FIG. 22). A delay of a downlink signal and an advanced time of an uplink signal are replaced with a position from a base station to a terminal and a transmission delay or a reception device of a terminal. As described above, when an ABS is partially set to a sub frame at a terminal side, it is necessary to decide a minimum value and a maximum value of the delay or the like in advance.

When an ABS is set to a sub frame in order to avoid interference, it is desirable to flexibly arrange an ABS in one of an uplink sub frame and a downlink sub frame not to arrange an ABS only in a downlink sub frame. It is because when an ABS is arranged only in a downlink sub frame, ABSs are concentrated in a specific configuration, and thus the throughput deteriorates.

FIG. 12 illustrates a format of an uplink signal. As described above, a PUSCH used as user data is allocated to a middle portion of a system bandwidth, and a PUCCH used as a control signal is allocated to both end portions indicated by hatching. Even when transmission of an uplink signal is stopped, since the PUCCH is a control signal, it is desirable not to stop a portion corresponding to the PUCCH as much as possible.

In this regard, even when an ABS is set to a sub frame allocated to the uplink, a portion corresponding to the PUCCH is not stopped. By setting an ABS so that data of both end portions of the system bandwidth of a downlink sub frame causing interference is not used, a setting can be made so that a portion corresponding to the PUCCH is not stopped.

Figure 15:
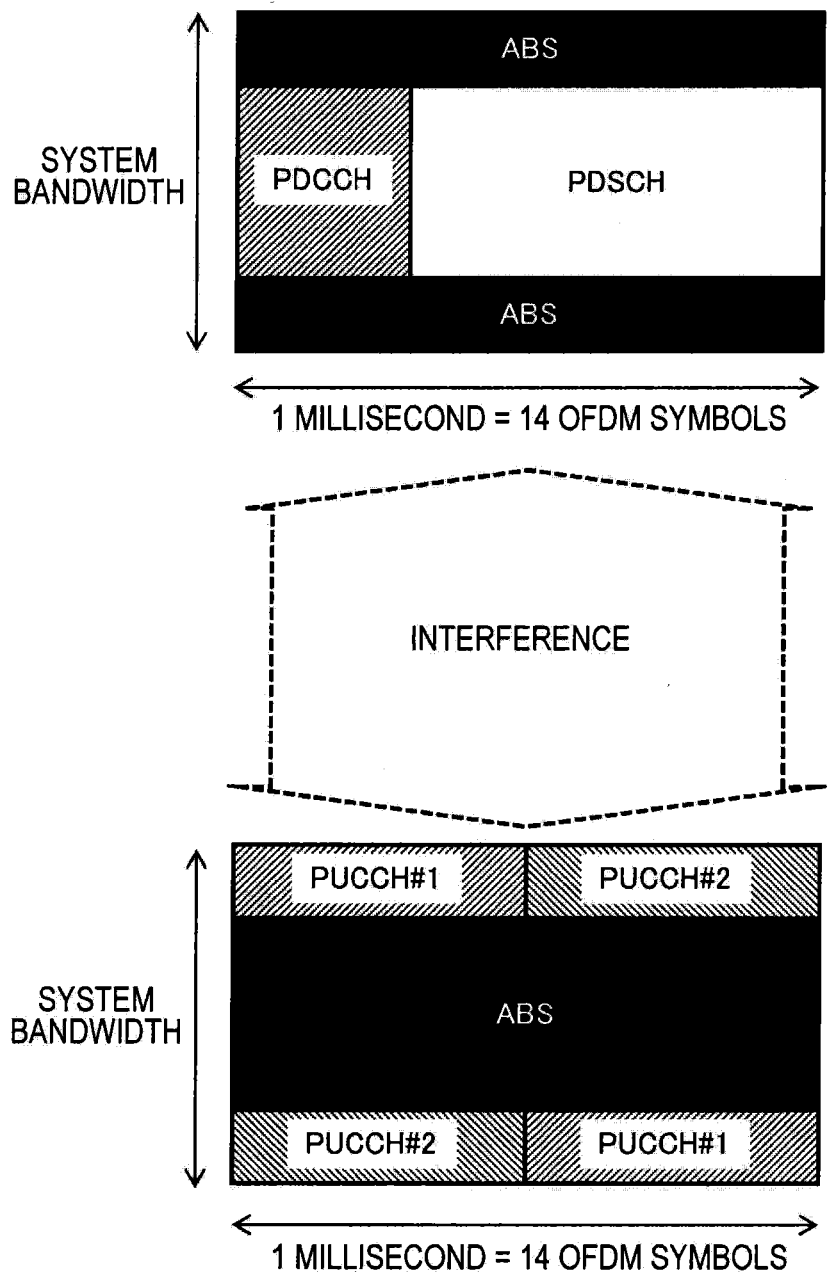
FIG. 15 is a diagram illustrating an example in which an ABS is set so that a portion corresponding to a PUCCH is not stopped for all sub frames allocated to an uplink from a point of view of a base station.

FIG. 15 illustrates an example in which an ABS is set so that transmission of a portion corresponding to the PUCCH is not stopped for all sub frames allocated to the uplink from a point of view of a base station. As illustrated in FIG. 15, an ABS is set to a portion corresponding to a PUSCH used as user data in a middle portion excluding a PUCCH used as a control signal in both ends of the system bandwidth of the uplink signal. Further, an ABS is set so that both end portions of the system bandwidth are not used for all sub frames, allocated to the downlink, which interfere with the uplink signal. Thus, a setting can be made so that reception through a portion corresponding to a PUCCH of a sub frame allocated to the uplink is not stopped.

Figure 16:
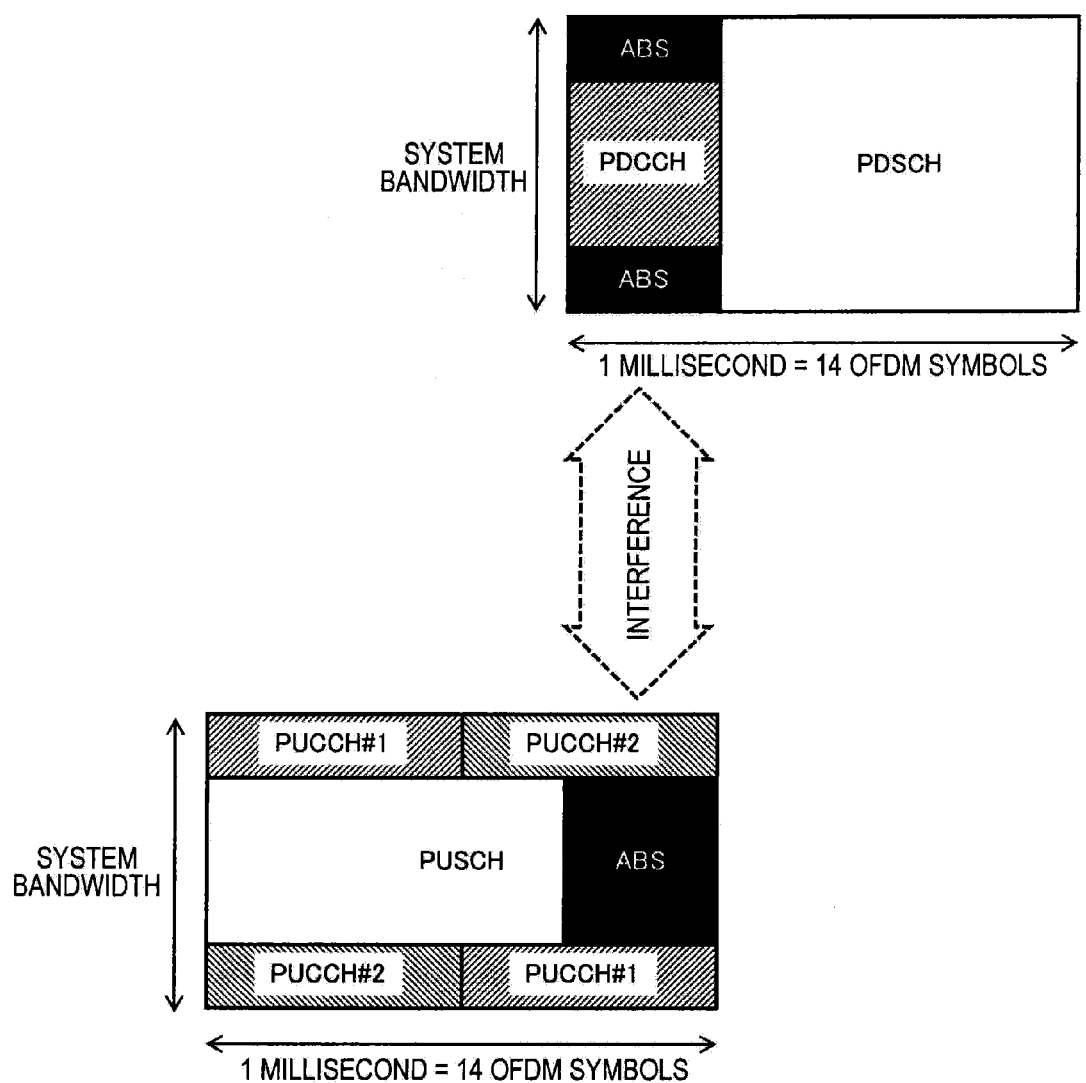
FIG. 16 is a diagram illustrating an example in which an ABS is set to a second half portion of a sub frame allocated to an uplink so that a portion corresponding to a PUCCH is not stopped from a point of view of a terminal.

FIG. 16 illustrates an example in which an ABS is set only to a second half portion of a sub frame allocated to the uplink so that a portion corresponding to a PUCCH is not stopped from a point of view of a terminal. As illustrated in FIG. 16, in a second half portion of an uplink signal, an ABS is set to a portion corresponding to a PUSCH used as user data in a middle portion excluding a PUCCH used as a control signal of a system bandwidth. In a first half portion of a sub frame, allocated to the downlink, which interferes with the uplink signal, an ABS is set so that data in both end portions of a system bandwidth is not used. Thus, a setting can be made so that the portion corresponding to the PUCCH of the sub frame allocated to the uplink is not stopped.

Figure 17:
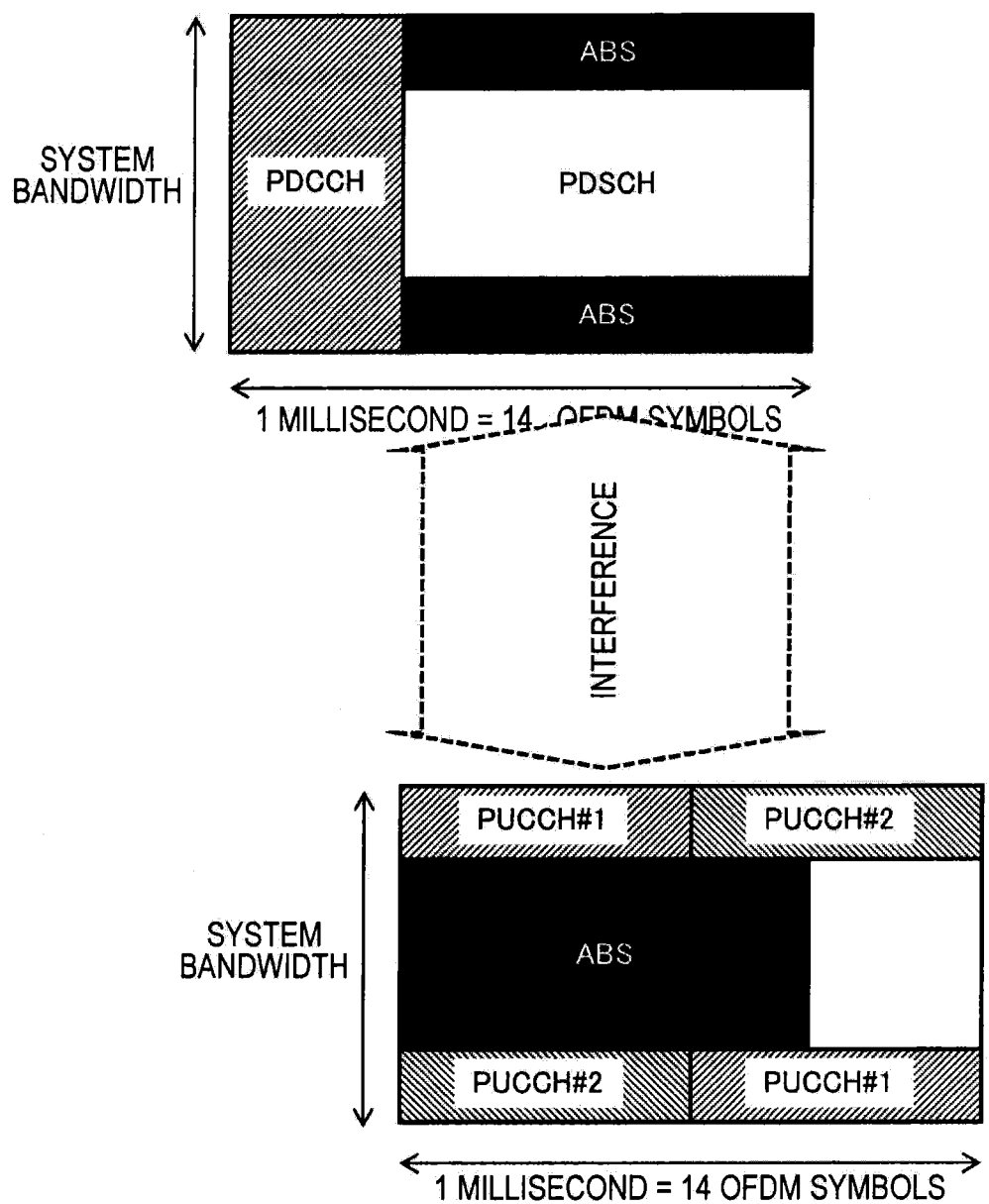
FIG. 17 is a diagram illustrating an example in which an ABS is set to a first half portion of a sub frame allocated to an uplink so that a portion corresponding to a PUCCH is not stopped from a point of view of a terminal.

FIG. 17 illustrates an example in which an ABS is set only to a first half portion of a sub frame allocated to the uplink so that a portion corresponding to a PUCCH is not stopped from a point of view of a terminal. As illustrated in FIG. 17, in a first half portion of an uplink signal, an ABS is set to a portion corresponding to a PUSCH used as user data in a middle portion excluding a PUCCH used as a control signal of a system bandwidth. In a second half portion of a sub frame, allocated to the downlink, which interferes with the uplink signal, an ABS is set so that data in both end portions of a system bandwidth is not used. Thus, a setting can be made so that the portion corresponding to the PUCCH of the sub frame allocated to the uplink is not stopped.

Here, referring back to FIG. 15, when in a first half portion of a downlink sub frame, an ABS is set so that data in both end portions of a system bandwidth is not used, there is a problem in that it is difficult to transmit both end portions of a system bandwidth of a PDCCH inserted into a first half portion of a downlink signal.

Figure 18:
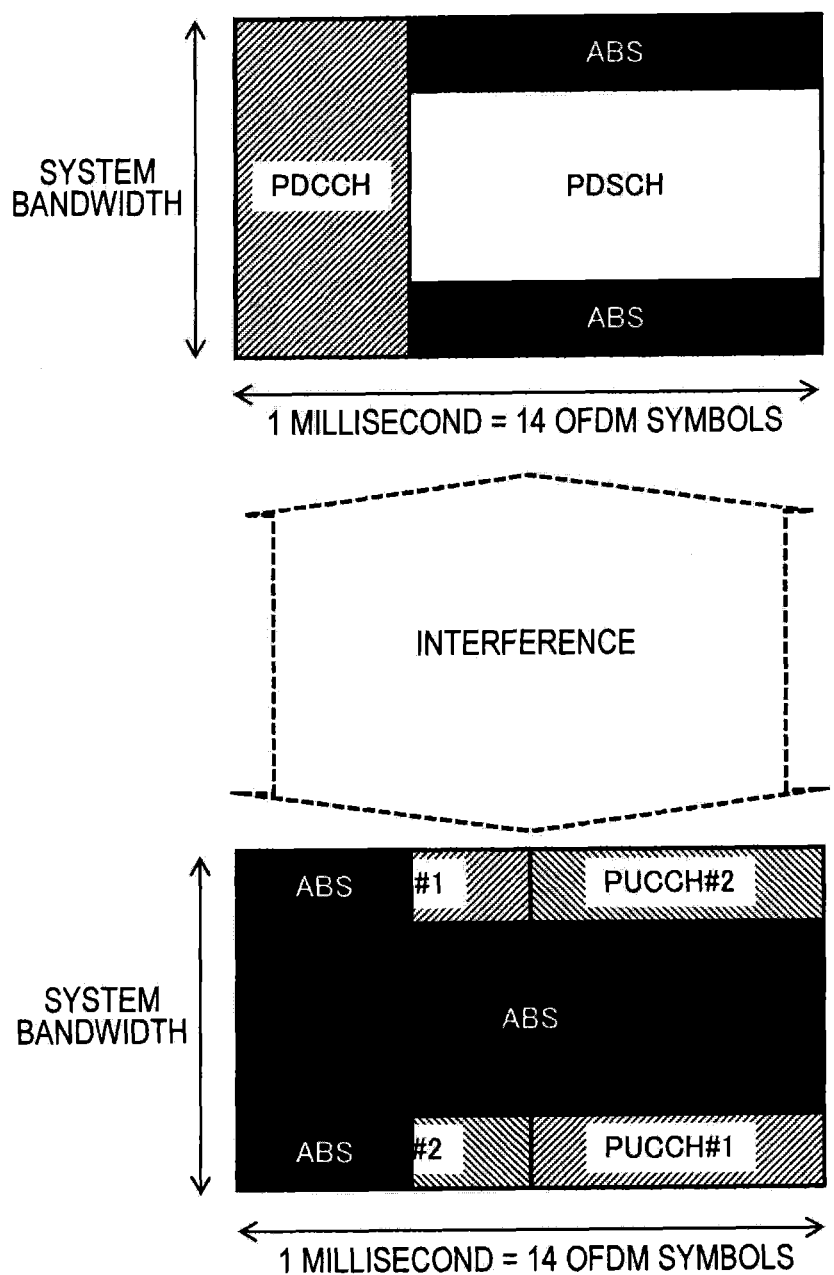
FIG. 18 is a diagram illustrating an alternative solution of an ABS setting method illustrated in FIG. 15.

FIG. 18 illustrates an alternative solution of FIG. 15. An ABS is set to a portion corresponding to a PUSCH used as user data in a middle portion excluding a PUCCH used as a control signal in both ends of a system bandwidth of an uplink signal. Further, an ABS is also set to a portion, which overlaps a PDCCH of a downlink signal, in PUCCHs in both ends of a system bandwidth of an uplink signal. Meanwhile, an ABS is set so that both end portions of a system bandwidth of a PDSCH used as user data are not used in a downlink sub frame interfering with the uplink signal. Thus, a setting can be made so that a portion corresponding to a PUCCH of a sub frame allocated to the uplink and a portion corresponding to a PDCCH of a sub frame allocated to the downlink are not stopped. In an uplink signal, the same information is transmitted twice as a PUCCH. Therefore, even when an ABS is set so that both end portions of a system bandwidth are not used in a first half portion of a PUCCH as described above, a diversity effect is lowered, but a base station can receive a PUCCH.

In the cellular communication system, a setting of a configuration and a setting of an ABS in each cell using any configuration described above are practically performed by an MME (mobile management entity) which a core network device.

For example, the MME performs a process of rearranging the seven TDD configurations 0 to 6 defined in the LTE (TS36.211 Table 4.2-2) illustrated in FIG. 23 through the above-described procedure, obtains the arrangement illustrated in FIG. 1 (Table 2) or FIG. 4 (Table 5), and stores the arrangement in a table or the like. Further, the MME performs an ABS setting of each sub frame when different configurations are set in neighboring cells, and stores information of an ABS setting position. Alternatively, the configuration rearrangement process may be performed by a device other than the MME, and the MME may store the table in which the arrangement illustrated in FIG. 1 (Table 2) or FIG. 4 (Table 5) is described, which is obtained from an external device. Then, the MME may allocate a configuration used by a cell to each base station (eNodeB) with reference to the table. Further, an ABS setting of each sub frame when different configurations are set in neighboring cells may be also performed by a device other than the MME, and the MME may hold obtained ABS setting information.

In the cellular communication system according to the technology disclosed in the present disclosure, a TDD configuration is considered to be a static setting to a certain extent. In other words, when a setting is made once, a system is operated with the same setting for about one year. Specifically, the operator sets a designed TDD environment to an eNodeB through an MME. Then, the eNodeB is considered to set the information to each terminal (UE) located in a cell through system information or dedicated signaling. However, it is difficult to deny a possibility that a Het-Net (heterogeneous network) environment will make a progress, and a system in which a TDD configuration is traded dynamically according to a change in traffic will appear.

Figure 19:
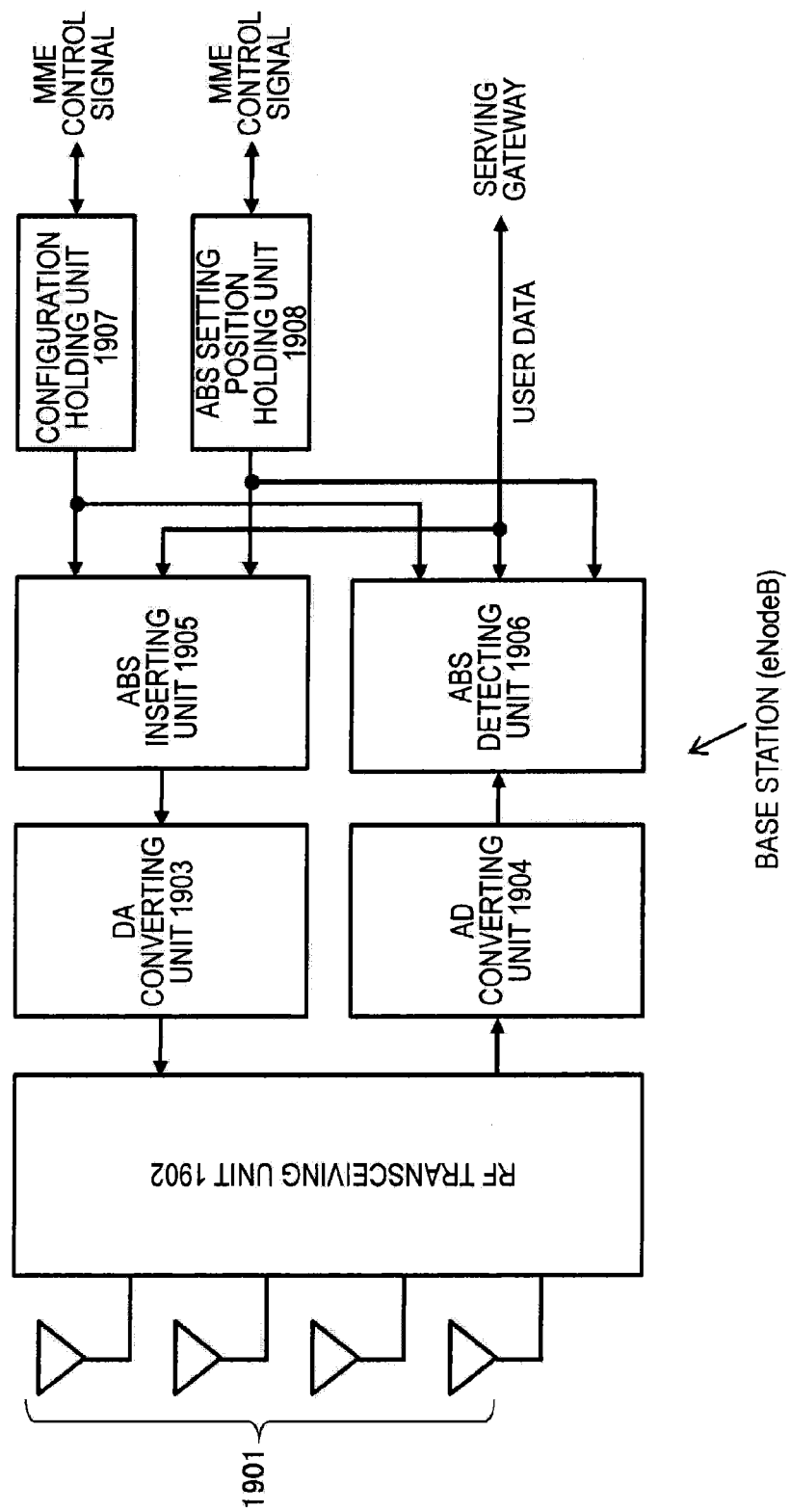
FIG. 19 is a diagram schematically illustrating a functional configuration of a communication device operating as a base station (eNodeB) in a cellular communication system according to the technology disclosed in the present disclosure.

FIG. 19 schematically illustrates a functional configuration of a communication device operating as a base station (eNodeB) in a cellular communication system according to the technology disclosed in the present disclosure.

A configuration holding unit 1907 holds information related to a TDD configuration which is set by a control signal from an MME (not illustrated) and used in its own cell. An ABS setting position holding unit 1908 holds a position of a sub frame which is set by a control signal from an MME and is to be subjected to an ABS in a configuration used in its own cell.

A base station may not set a configuration used in its own cell according to a control signal from an MME and may set a configuration used in a cell by the base station and hold the set configuration in the configuration holding unit 1907. For example, the base station may hold the table in which the arrangement illustrated in FIG. 1 (Table 2) or FIG. 4 (Table 5) is described and set a configuration to be used in a cell by the base station with reference to the table when a configuration being used in a neighboring cell is acquired through communication between base stations or the like.

Alternatively, the base station may not set a position of a sub frame which is subjected to an ABS in its own cell according to a control signal from an MME and may determine whether the base station has to perform an ABS in each sub frame in its own cell and hold the determination result in the ABS setting position holding unit 1608. For example, the base station holds the table in which the arrangement illustrated in FIG. 1 (Table 2) or FIG. 4 (Table 5) is described, and when a configuration being used in a neighboring cell is acquired through communication between base stations or the like, the base station compares the acquired configuration with the configuration to be used in its own cell with reference to the table, determines whether an ABS is to be performed in each sub frame in its own cell, and holds the determination result in the ABS setting position holding unit 1908.

The base station performs uplink or downlink communication through each sub frame of a radio frame according to a TDD configuration held in the configuration holding unit 1907.

The base station receives user data to be transmitted to a terminal (UE) in its own cell through the downlink from a serving gateway. An ABS inserting unit 1905 inserts an ABS to a position of a sub frame held in the ABS setting position holding unit 1908 in each of a PDCCH (Phy Downlink Control Channel) and a PDSCH (Phy Downlink Shared Channel).

A DA converting unit 1903 converts a digital transmission signal into an analog transmission signal. Then, an RF transceiving unit 1902 up-converts the analog transmission signal to an RF band, performs power amplification, and emits a resultant signal to space through an antenna 1901.

Further, when the base station receives an uplink signal transmitted from a terminal (UE) through the antenna 1901, the RF transceiving unit 1902 performs low noise amplification and down-conversion, and an AD converting unit 1904 performs digital conversion.

An ABS detecting unit 1906 detects an ABS from the uplink signal after the digital conversion at a position of a sub frame held in the ABS setting position holding unit 1908 in each of a PUCCH (Phy Uplink Control Channel) and a PUSCH (Phy Uplink Shared Channel).

Figure 20:
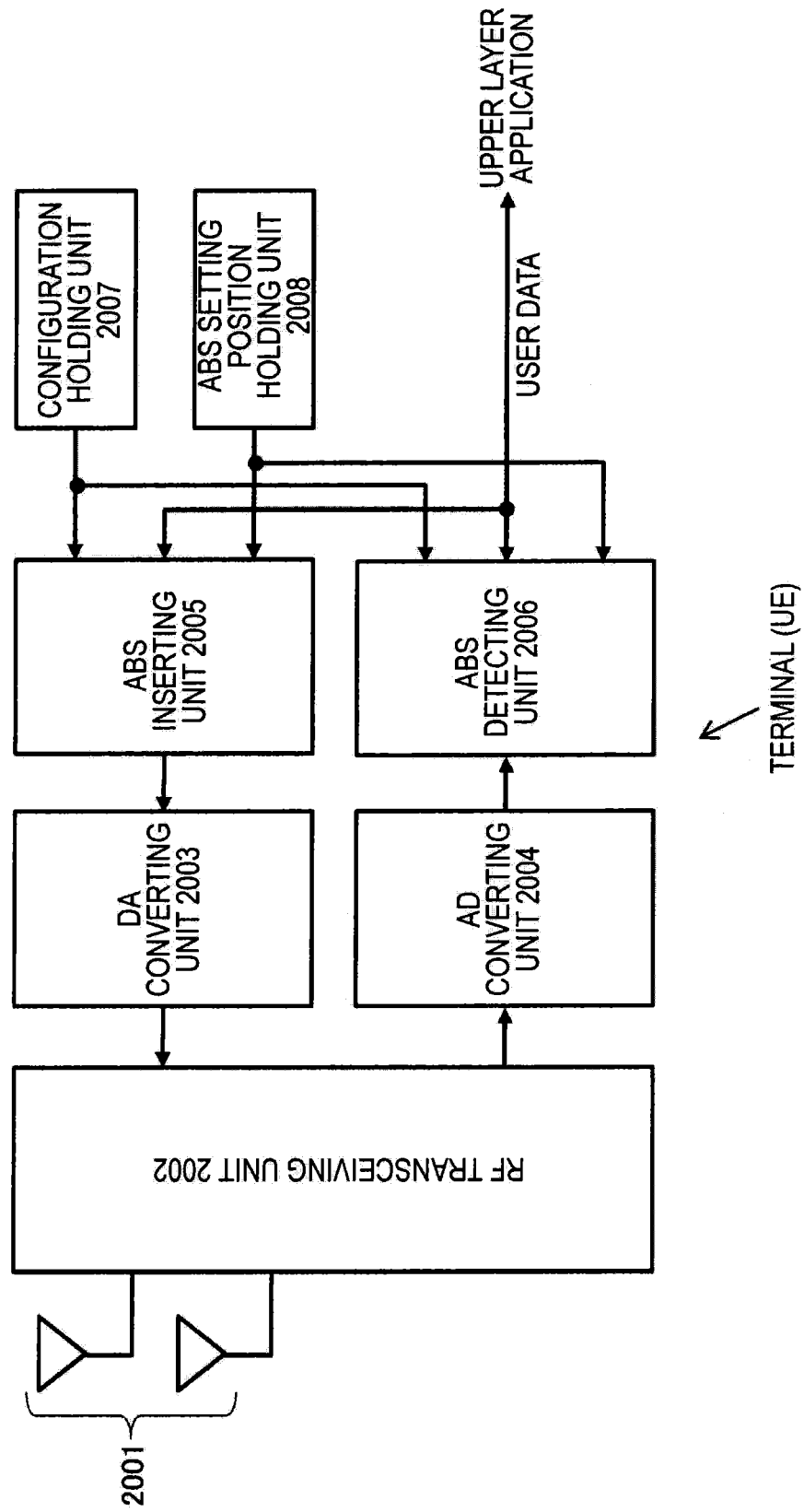
FIG. 20 is a diagram schematically illustrating a functional configuration of a communication device operating as a terminal (UE) in a cellular communication system according to the technology disclosed in the present disclosure.
Figure 21:
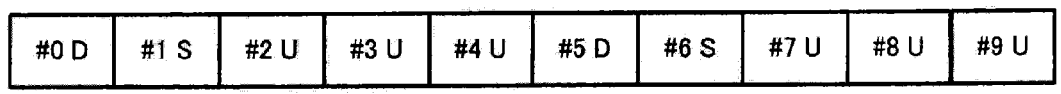
FIG. 21 is a diagram illustrating an example in which 10 consecutive sub frames #0 to #9 of a radio frame are allocated as an uplink sub frame and a downlink sub frame and shared.

FIG. 20 schematically illustrates a functional configuration of a communication device operating as a terminal (UE) in a cellular communication system according to the technology disclosed in the present disclosure.

When the terminal (UE) is notified of information related to a TDD configuration through signaling from a base station (eNodeB) controlling its own station, the terminal (UE) holds the information in a configuration holding unit 2007. Further, when a position of a sub frame which is subjected to an ABS in a configuration to be used in a corresponding cell is notified through signaling from a base station, the position is hold in an ABS setting position holding unit 2008.

The terminal performs uplink or downlink communication through each sub frame of a radio frame according to a TDD configuration held in the configuration holding unit 2007.

The terminal receives user data to be transmitted to a base station through the uplink from an upper layer such as an application. An ABS inserting unit 2005 inserts an ABS into a position of a sub frame held in the ABS setting position holding unit 2008 in each of a PUCCH and a PUSCH.

A DA converting unit 2003 converts a digital transmission signal into an analog transmission signal. Then, an RF transceiving unit 2002 up-converts the analog transmission signal to an RF band, performs power amplification, and emits a resultant signal to space through an antenna 2001.

Further, when the terminal receives a downlink signal transmitted from a base station through the antenna 2001, the RF transceiving unit 2002 performs low noise amplification and down-conversion, and an AD converting unit 2004 performs digital conversion.

An ABS detecting unit 2006 detects an ABS from the uplink signal after the digital conversion at a position of a sub frame held in the ABS setting position holding unit 2008 in each of a PDCCH and a PDSCH.

Further, the technologies disclosed herein are also possible to adopt the following configurations.

(1) A wireless resource allocation method, including: a configuration switching step of switching configurations between neighboring cells when different configurations are used in the neighboring cells in a cellular communication system in which a plurality of configurations different in an uplink allocation and a downlink allocation of sub frames in a radio frame are defined; and an interference avoiding step of avoiding interference between the neighboring cells in sub frames in which the uplink and the downlink are mismatched between the neighboring cells whose configurations are switched in the configuration switching step.

(2) The wireless resource allocation method according to (1) described above, wherein, in the interference avoiding step, in the sub frames in which the uplink and the downlink are mismatched between base stations of the neighboring cells whose configurations are switched, transmission from a base station through all downlink sub frames is stopped, or reception of a base station through all uplink sub frames is stopped.

(3) The wireless resource allocation method according to (1) described above, wherein, in the interference avoiding step, in the sub frames in which the uplink and the downlink are mismatched between terminals of the neighboring cells whose configurations are switched, reception of a terminal through a mismatched portion of a downlink sub frame is stopped, or transmission from a terminal through a mismatched portion of an uplink sub frame is stopped.

(4) The wireless resource allocation method according to (1) described above, wherein, in the interference avoiding step, when a single sub frame of a terminal in one of the cells whose configurations are switched is mismatched with two sub frames of a terminal in the other cell, transmission or reception through the single sub frame of the terminal in the one cell is stopped.

(5) The wireless resource allocation method according to any one of (1) to (4) described above, wherein, in the cellular communication system, a control signal PDCCH is allocated to a first half portion of a downlink signal and a control signal PUCCH is allocated to both end portions of a system bandwidth of an uplink signal; and in the interference avoiding step, in sub frames in which the uplink and the downlink are mismatched between the neighboring cells whose configurations are switched, interference between base stations or terminals of the neighboring cells is avoided while having transmission and reception of the control signal PDCCH and the control signal PUCCH not to be stopped.

(6) The wireless resource allocation method according to (5) described above, wherein, in the interference avoiding step, in sub frames in which the uplink and the downlink are mismatched between base stations of the neighboring cells whose configurations are switched, transmission from a base station through a portion allocated to the control signal PUCCH in both ends of a system bandwidth is stopped for all mismatched downlink sub frames, and reception of a base station through a portion which is not allocated to the control signal PUCCH in a middle portion of a system band is stopped for all mismatched uplink sub frames.

(7) The wireless resource allocation method according to (5) described above, wherein, in the interference avoiding step, in sub frames in which the uplink and the downlink are mismatched between terminals of the neighboring cells whose configurations are switched, reception of a terminal through a portion allocated to the control signal PUCCH in both ends of a system bandwidth in a mismatched portion of a downlink sub frame is stopped, and transmission from a terminal through a portion which is not allocated to the control signal PUCCH in a middle portion of a system band in a mismatched portion of an uplink sub frame is stopped.

(8) The wireless resource allocation method according to (6) described above, wherein a base station does not stop transmission through a portion which is allocated to the control signal PDCCH even in portions which are allocated to the control signal PUCCH in both ends of a system bandwidth in a mismatched downlink sub frame, and reception of a base station through a portion allocated to the control signal PUCCH in a neighboring cell in both ends of a mismatched uplink sub frame of a system bandwidth is stopped.

(9) The wireless resource allocation method according to any one of (1) to (8) described above, further including, a rearranging step of rearranging an order of the plurality of configurations in the ascending order of the number of downlink sub frames and in the descending order of the number of uplink sub frames, wherein, in the configuration switching step, configurations are switched between neighboring cells according to the rearranged order of the rearranging step when different configurations are used in neighboring cells in the cellular communication system.

(10) The wireless resource allocation method according to (9) described above, wherein, in the rearranging step, an order of at least some of the plurality of configurations are further rearranged as the number of sub frames in which the uplink and the downlink are mismatched between configurations decreases, in the ascending order of the number of downlink sub frames without applying the descending order of the number of uplink sub frames.

(11) A wireless resource allocation device, including: a configuration switching unit that switches configurations between neighboring cells when different configurations are used in the neighboring cells in a cellular communication system in which a plurality of configurations different in an uplink allocation and a downlink allocation of sub frames in a radio frame are defined; and an interference avoiding unit that avoids interference between the neighboring cells in sub frames in which the uplink and the downlink are mismatched between the neighboring cells whose configurations are switched by the configuration switching unit.

(12) A communication system, including: switching configurations between neighboring cells when different configurations are used in the neighboring cells in a cellular communication system in which a plurality of configurations different in an uplink allocation and a downlink allocation of sub frames in a radio frame are defined; and avoiding interference between the neighboring cells in sub frames in which the uplink and the downlink are mismatched between the neighboring cells whose configurations are switched.

INDUSTRIAL APPLICABILITY

The technology disclosed in the present disclosure has been described in detail with reference to a specific embodiment. However, it is obvious that a person skilled in the art can make modifications or substitutions on the above embodiment within the scope not departing from the gist of the technology disclosed in the present disclosure.

The present disclosure has been described in connection with the embodiment applied to a cellular communication system conforming to the LTE designed by the 3GPP, but the gist of the technology disclosed in the present disclosure is not limited to this example. Interference caused as the uplink and the downlink are mismatched when different configurations are used in neighboring cells can be avoided by similarly applying the present technology to various cellular communication systems in which a plurality of configurations in which an uplink allocation and a downlink allocation of sub frames in a radio frame are different from each other are defined.

In short, the present technology is disclosed as an embodiment, and thus the description of the present disclosure is not interpreted to be limited. The gist of the present technology should be determined in consideration of the appended claims.

REFERENCE SIGNS LIST

1901 Antenna
1902 RF transceiving unit
1903 DA converting unit
1904 AD converting unit
1905 ABS inserting unit
1906 ABS detecting unit
1907 Configuration holding unit
1908 ABS setting position holding unit
2001 Antenna
2002 RF transceiving unit
2003 DA converting unit
2004 AD converting unit
2005 ABS inserting unit
2006 ABS detecting unit
2007 Configuration holding unit
2008 ABS setting position holding unit

The invention claimed is:

1. A wireless resource allocation method, comprising:
switching configurations between neighboring cells when different configurations are used in the neighboring cells in a cellular communication system in which a plurality of configurations different in an uplink allocation and a downlink allocation of sub frames in a radio frame are defined;
rearranging an order of the plurality of configurations in an ascending order of number of downlink sub frames and in a descending order of number of uplink sub frames; and
avoiding interference between the neighboring cells in sub frames in which the uplink and the downlink are mismatched between the neighboring cells whose configurations are switched in the switching.

2. The wireless resource allocation method according to claim 1,
wherein, in the avoiding, in the sub frames in which the uplink and the downlink are mismatched between base stations of the neighboring cells whose configurations are switched, stopping transmission from a base station through all downlink sub frames, or stopping reception of a base station through all uplink sub frames.

3. The wireless resource allocation method according to claim 1,
wherein, in the avoiding, in the sub frames in which the uplink and the downlink are mismatched between terminals of the neighboring cells whose configurations are switched, stopping reception of a terminal through a mismatched portion of a downlink sub frame, or stopping transmission from a terminal through a mismatched portion of an uplink sub frame.

4. The wireless resource allocation method according to claim 1,
wherein, in the avoiding, when a single sub frame of a terminal in one of the cells whose configurations are switched is mismatched with two sub frames of a terminal in the other cell, stopping transmission reception through the single sub frame of the terminal in the one cell.

5. The wireless resource allocation method according to claim 1,
wherein, in the cellular communication system, a control signal PDCCH is allocated to a first half portion of a downlink signal and a control signal PUCCH is allocated to both end portions of a system bandwidth of an uplink signal; and
in the avoiding, in sub frames in which the uplink and the downlink are mismatched between the neighboring cells whose configurations are switched, avoiding interference between base stations or terminals of the neighboring cells while having transmission and reception of the control signal PDCCH and the control signal PUCCH not to be stopped.

6. The wireless resource allocation method according to claim 5,
wherein, in the avoiding, in sub frames in which the uplink and the downlink are mismatched between base stations of the neighboring cells whose configurations are switched, stopping transmission from a base station through a portion allocated to the control signal PUCCH in both ends of a system bandwidth for all mismatched downlink sub frames, and reception of a base station through a portion which is not allocated to the control signal PUCCH in a middle portion of a system band for all mismatched uplink sub frames.

7. The wireless resource allocation method according to claim 5,
wherein, in the avoiding, in sub frames in which the uplink and the downlink are mismatched between terminals of the neighboring cells whose configurations are switched, stopping reception of a terminal through a portion allocated to the control signal PUCCH in both ends of a system bandwidth in a mismatched portion of a downlink sub frame, and stopping transmission from a terminal through a portion which is not allocated to the control signal PUCCH in a middle portion of a system band in a mismatched portion of an uplink sub frame.

8. The wireless resource allocation method according to claim 6,
wherein a base station does not stop transmission through a portion which is allocated to the control signal PDCCH even in portions which are allocated to the control signal PUCCH in both ends of a system bandwidth in a mismatched downlink sub frame, and
stopping reception of a base station through a portion allocated to the control signal PUCCH in a neighboring cell in both ends of a mismatched uplink sub frame of a system bandwidth.

9. The wireless resource allocation method according to claim 1,
wherein, in the switching, switching configurations between neighboring cells according to the rearranged order of the rearranging when different configurations are used in neighboring cells in the cellular communication system.

10. The wireless resource allocation method according to claim 9,
wherein, in the rearranging, further rearranging an order of at least some of the plurality of configurations as the number of sub frames in which the uplink and the downlink are mismatched between configurations decreases, in the ascending order of the number of downlink sub frames without applying the descending order of the number of uplink sub frames.

11. A wireless resource allocation device, comprising:
a configuration switching unit that switches configurations between neighboring cells when different configurations are used in the neighboring cells in a cellular communication system in which a plurality of configurations different in an uplink allocation and a downlink allocation of sub frames in a radio frame are defined;
a rearranging unit that rearranges an order of the plurality of configurations in an ascending order of number of downlink sub frames and in a descending order of number of uplink sub frames; and
an interference avoiding unit that avoids interference between the neighboring cells in sub frames in which the uplink and the downlink are mismatched between the neighboring cells whose configurations are switched by the configuration switching unit.

12. A communication system, comprising:
circuitry configured to
switch configurations between neighboring cells when different configurations are used in the neighboring cells in a cellular communication system in which a plurality of configurations different in an uplink allocation and a downlink allocation of sub frames in a radio frame are defined,
rearrange an order of the plurality of configurations in an ascending order of number of downlink sub frames and in a descending order of number of uplink sub frames, and
avoid interference between the neighboring cells in sub frames in which the uplink and the downlink are mismatched between the neighboring cells whose configurations are switched.

* * * * *